United States Patent
Baek et al.

(10) Patent No.: US 11,124,295 B2
(45) Date of Patent: Sep. 21, 2021

(54) TRANSFORMABLE UNMANNED AERIAL VEHICLE

(71) Applicant: Samsung Electronics Co., Ltd., Gyeonggi-do (KR)

(72) Inventors: Seung-Chul Baek, Gyeonggi-do (KR); Sang-In Baek, Gyeonggi-do (KR); Min-Sung Lee, Gyeonggi-do (KR); Jong-Chul Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 648 days.

(21) Appl. No.: 16/002,693

(22) Filed: Jun. 7, 2018

(65) Prior Publication Data

US 2018/0354620 A1  Dec. 13, 2018

(30) Foreign Application Priority Data

Jun. 8, 2017 (KR) .................. 10-2017-0071632

(51) Int. Cl.
*B64C 39/02* (2006.01)

(52) U.S. Cl.
CPC ...... *B64C 39/024* (2013.01); *B64C 2201/024* (2013.01); *B64C 2201/027* (2013.01); *B64C 2201/042* (2013.01); *B64C 2201/108* (2013.01); *B64C 2201/146* (2013.01); *B64C 2201/20* (2013.01)

(58) Field of Classification Search
CPC ........ B64C 2201/024; B64C 2201/027; B64C 2201/042; B64C 2201/108; B64C 2201/146; B64C 2201/165; B64C 2201/20
See application file for complete search history.

(56) References Cited

U.S. PATENT DOCUMENTS

| | | | | |
|---|---|---|---|---|
| 6,164,590 A | * | 12/2000 | Kusic | B64C 27/08 244/17.11 |
| 8,444,082 B1 | | 5/2013 | Foch | |
| 10,011,354 B2 | * | 7/2018 | Goldstein | B64C 39/024 |
| 10,259,579 B2 | * | 4/2019 | Goldstein | B64C 39/024 |
| 10,625,855 B2 | * | 4/2020 | Deng | B64C 1/30 |
| 10,625,857 B2 | * | 4/2020 | Goldstein | B64C 39/024 |
| 10,710,701 B2 | * | 7/2020 | Tian | B64C 1/30 |

(Continued)

OTHER PUBLICATIONS

Korean Office Action dated May 4, 2021 issued in counterpart application No. 10-2017-0071632, 8 pages.

*Primary Examiner* — Philip J Bonzell
(74) *Attorney, Agent, or Firm* — The Farrell Law Firm, P.C.

(57) ABSTRACT

An unmanned aerial vehicle is provided. The unmanned aerial vehicle includes a housing with a first housing structure and a second housing structure, a wireless communication circuit coupled to the housing or located inside the housing for wireless communication with an external controller, a plurality of propulsions systems coupled to the housing, and a navigation circuit configured to control the plurality of propulsion systems. At least one of the plurality of propulsion systems includes a plurality of folding arms pivotally coupled to one of the first housing structure and the second housing structure, a motor controlled by the navigation circuit, and a propeller coupled to the motor. The housing has at least one recess to accommodate at least part of the plurality of propulsion systems in the second state.

16 Claims, 25 Drawing Sheets

(56) References Cited

U.S. PATENT DOCUMENTS

| | | | |
|---|---|---|---|
| 2016/0176520 A1* | 6/2016 | Goldstein | B64C 39/024 244/17.17 |
| 2018/0105254 A1* | 4/2018 | Tian | B64C 27/08 |
| 2018/0297704 A1* | 10/2018 | Goldstein | B64C 39/024 |
| 2018/0327092 A1* | 11/2018 | Deng | B64C 39/024 |
| 2019/0168871 A1* | 6/2019 | Goldstein | B64C 39/024 |
| 2019/0337618 A1* | 11/2019 | Zhou | G08C 17/02 |
| 2020/0062373 A1* | 2/2020 | Liao | B64C 39/024 |
| 2020/0283146 A1* | 9/2020 | Goldstein | B64C 39/024 |
| 2020/0377212 A1* | 12/2020 | Deng | B64C 1/30 |

* cited by examiner

TRANSFORMABLE UNMANNED AERIAL VEHICLE

CROSS REFERENCE TO RELATED APPLICATION(S)

This application is based on and claims priority under 35 U.S.C. § 119 to Korean Patent Application No. 10-2017-0071632, filed on Jun. 8, 2017, in the Korean Intellectual Property Office, the entire disclosure of which is incorporated herein by reference.

BACKGROUND

1. Field

The disclosure relates, generally, to a transformable unmanned aerial vehicle.

2. Description of Related Art

An unmanned aerial vehicle, or a drone, is an aerial vehicle that can fly automatically through remote control without a human on board. Unlike a typical aerial vehicle, the unmanned aerial vehicle does not require an additional space for the human on board, and thus can be made smaller in size and lighter in weight.

Therefore, although unmanned aerial vehicles have been developed and utilized for military purposes for information collection and reconnaissance in areas where user access is difficult, the unmanned aerial vehicle has recently been equipped with an image capturing features, resulting in the commercialization and popularization of the unmanned aerial vehicles.

Although large propeller may improve flight performance of the unmanned aerial vehicle, there may be a structural constraint in which a size of the main body for accommodating the arm is increased along with an increase in a size of the propeller. When the main body of the unmanned aerial vehicle is large in size, a center of gravity is not concentrated and air resistance is increased, and thus flight performance may deteriorate With the popularization of unmanned aerial vehicles, portability of the unmanned aerial vehicle may be an important feature for selecting the unmanned aerial vehicle.

SUMMARY

The present disclosure has been made to address at least the disadvantages described above and to provide at least the advantages described below.

Accordingly, an aspect of the present disclosure provides a transformable drone in which an arm for fixing a propeller can be folded and unfolded against a main body (or an airframe) which may provide a transformable unmanned aerial vehicle which combines portability and flight performance through a transformable main body (or an airframe).

In accordance with an aspect of the disclosure, there is provided an unmanned aerial vehicle. The unmanned aerial vehicle includes a housing with a first housing structure and a second housing structure, a wireless communication circuit coupled to the housing or located inside the housing for wireless communication with an external controller, a plurality of propulsions systems coupled to the housing, and a navigation circuit configured to control the plurality of propulsion systems. At least one of the plurality of propulsion systems includes a plurality of folding arms pivotally coupled to one of the first housing structure and the second housing structure, a motor controlled by the navigation circuit, and a propeller coupled to the motor. In both of the first housing structure and the second housing structure, the housing is configured to have a first length in a first state and have a second length longer than the first length in a second state, the housing has at least one recess to accommodate at least part of the plurality of propulsion systems in the second state, and the unmanned aerial vehicle is configured to fly by using the plurality of propulsion systems located outside the recess in the first state.

In accordance with an aspect of the disclosure, there is provided an unmanned aerial vehicle. The unmanned aerial vehicle includes a housing with a first housing structure to which an electronic speed control (ESC) module is mounted, and a second housing structure to which a battery unit is mounted, when the second housing structure is slidably coupled to the first housing structure along a first axis, a wireless communication circuit coupled to the housing, located in the housing, and configured to wirelessly communicate with an external controller, and a plurality of propulsion systems coupled to the housing and controlled by the ESC module. The second housing structure slidably moves with respect to the first housing structure such that the ESC module and the battery unit are coupled to or separated from each other.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
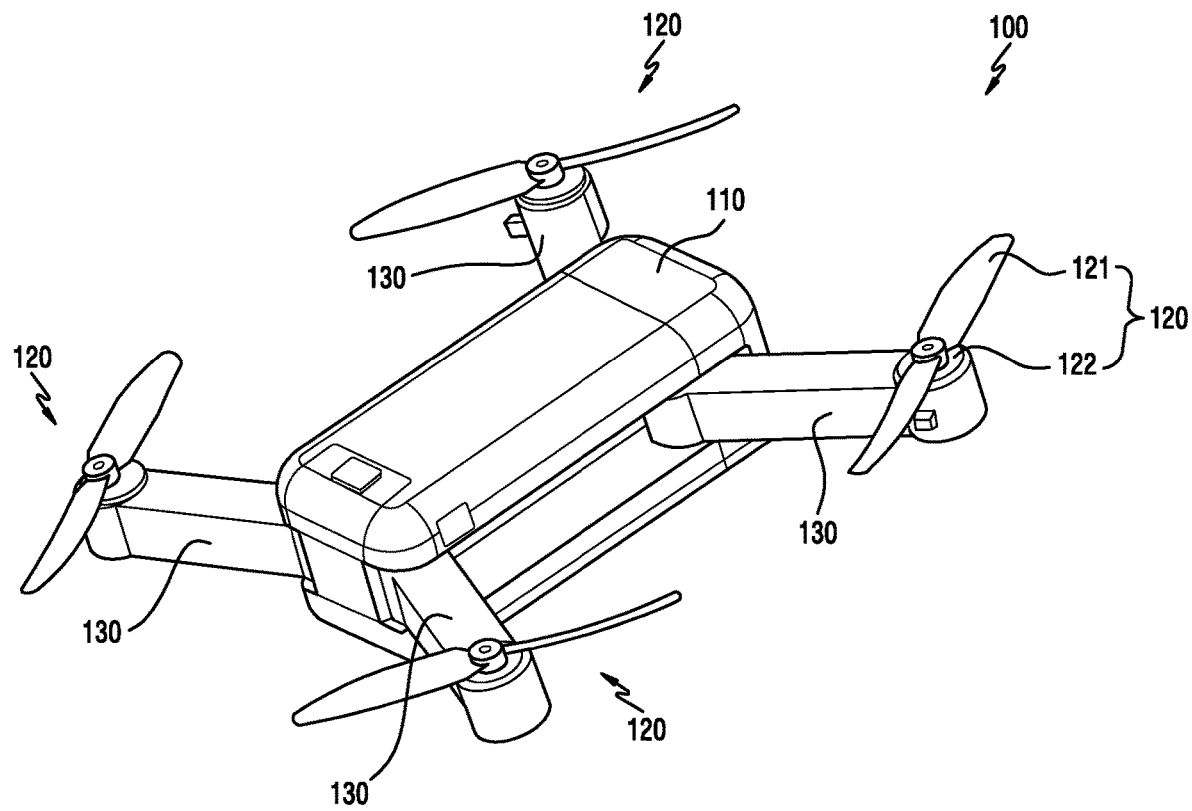
FIG. 1 is a diagram an unmanned aerial vehicle according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

In addition, an orthogonal coordinate system is used, in which an x-axis may imply a widthwise direction of an electronic device, a y-axis may imply a lengthwise direction of the electronic device, and a z-axis may imply a thickness direction of the electronic device. However, the x-axis, the y-axis, and the z-axis are not limited to three axes on the orthogonal coordinate system, and may be interpreted in a broad sense including this. For example, the x-axis, the y-axis, and the z-axis may be orthogonal to each other, but may refer to different directions not orthogonal to each other.

An unmanned aerial vehicle may include a tri-rotor having three propellers (or propulsion systems), a quad-rotor having four propellers, a penta-rotor having five propellers, a hex-rotor having six propellers, an octo-rotor having eight propellers, and the like. Although the quad-rotor is described for example in the following description, the unmanned aerial vehicle is not limited thereto, and thus the number of propellers and respective configurations and rotation directions may be various.

FIG. 1 is a diagram of an unmanned aerial vehicle 100 according to an embodiment.

Referring to FIG. 1, an unmanned aerial vehicle 100 includes a housing 110, a plurality of propulsion systems 120, and a plurality of folding arms 130.

The housing 110 may be located at a center of the unmanned aerial vehicle 100 and may serve as a center of gravity for balancing the unmanned aerial vehicle 100. The housing 110 may provide an inner space capable of mounting various components such as a communication device, control device, an image capturing device, etc., equipped in the unmanned aerial vehicle 100.

The plurality of propulsion systems 120 may provide thrust to the unmanned aerial vehicle 100 so that the unmanned aerial vehicle 100 can fly. Each of the plurality of propulsion systems 120 may include a propeller 121 and a motor 122 configured to rotate the propeller 121. The propeller 121 may change a rotation force of the motor 122 to a propulsive force. The unmanned aerial vehicle 100 may fly by using the propulsive force of the plurality of propellers 121. The propulsion system 120 may be referred to as a flight driving unit or a propeller assembly.

The plurality of folding arms 130 may couple the plurality of propulsion systems 120 to the housing 110. One end of the folding arm 130 may be disposed at the propulsion system 120, and the other end thereof may be pivotally coupled to the housing 110 on an axis parallel to a rotational axis of the propeller 121. The plurality of folding arms 130 may rotate such that at least part thereof is inserted into the housing 110 to facilitate storage of the unmanned aerial vehicle 100. The plurality of folding arms 130 may rotate to protrude from the housing 110 to allow the unmanned aerial vehicle 100 to fly. The unmanned aerial vehicle 100 may be referred to as a foldable unmanned aerial vehicle. A rotation operation of the folding arm 130 will be described below.

Figure 2:
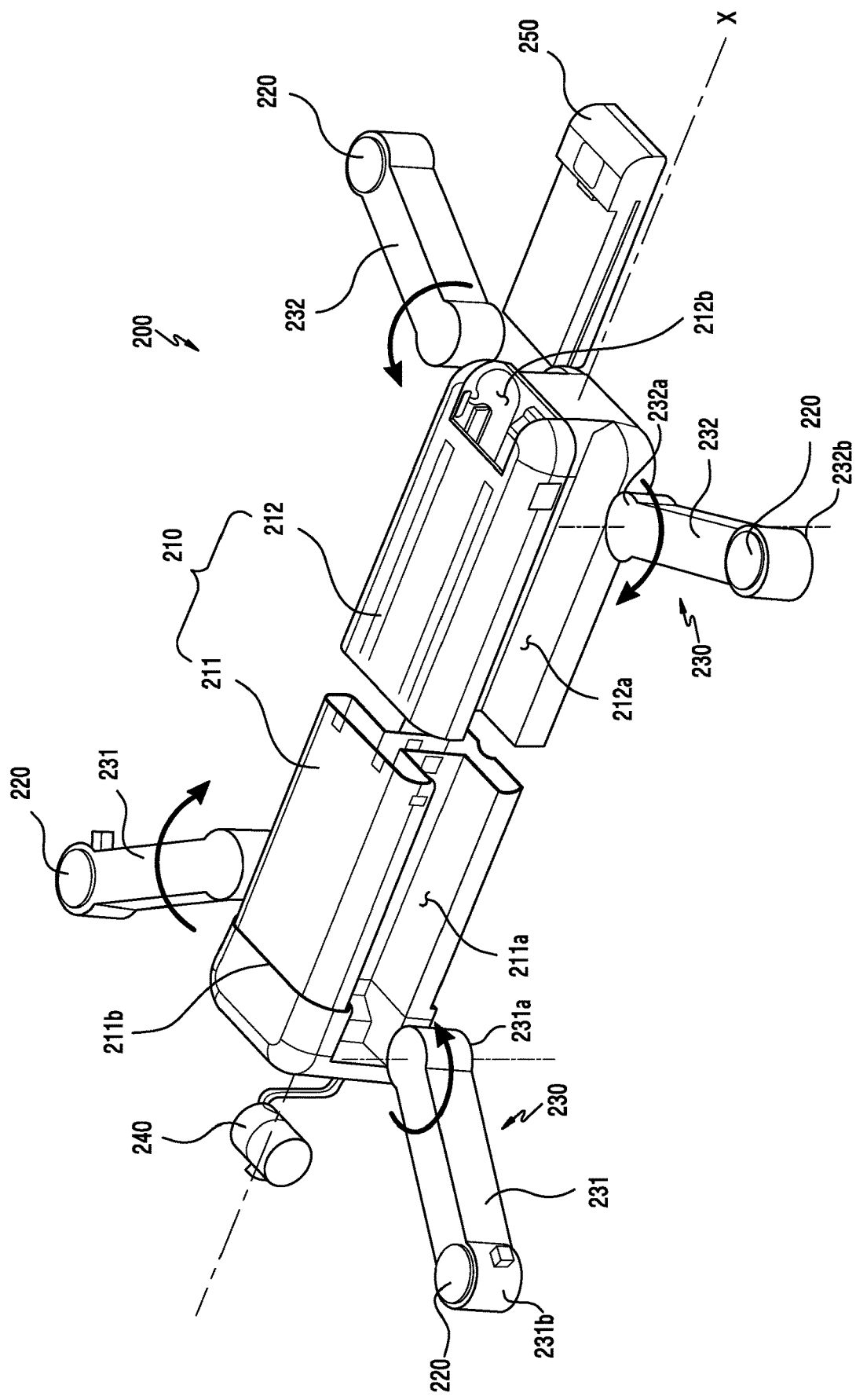
FIG. 2 is a diagram of an unmanned aerial vehicle according to an embodiment.

FIG. 2 is a diagram of an unmanned aerial vehicle 200 according to an embodiment.

Referring to FIG. 2, an unmanned aerial vehicle 200 includes a housing 210, a plurality of propulsion systems 220, a plurality of folding arms 230, an image capturing device 240, and a battery unit 250.

The housing 210 includes a first housing structure 211 and a second housing structure 212. The housing 210 may include an accommodation space (or a recess) for accommodating the plurality of folding arms 130. For example, the first housing structure 211 and the second housing structure 212 respectively include a first accommodation space 211a and a second accommodation space 212a, which may accommodate the plurality of folding arms 230 at a lateral portion. The first accommodation space 211a and the second accommodation space 212a may be coupled to each other to constitute one volume. The first housing structure 211 and the second housing structure 212 may be slidably coupled along a longitudinal direction (X-axis) of the unmanned aerial vehicle 200. A length of the housing 210 (or a whole length of the unmanned aerial vehicle 200) may be adjusted by a sliding movement of the first housing structure 211 and the second housing structure 212. Alternatively, the length or volume of the first accommodating space 211a and the second accommodating space 212a may be adjusted by a sliding movement of the first housing structure 211 and the second housing structure 212. The unmanned aerial vehicle 200 may be referred to as a transformable unmanned aerial vehicle.

The housing 210 may be slidably coupled to the second housing structure 212 in such a manner that the first housing structure 211 is inserted into the second housing structure 212. The first housing structure 211 may further include a stepped portion 211b so that an outer surface of the first housing structure 211 and the second housing structure 212 constitutes substantially one surface when the first housing structure 211 and the second housing structure 212 overlap in a greatest area, or vice versa. In addition, the first housing structure 211 and the second housing structure 212 may further include a guide rail or a guide member to facilitate a mutual sliding movement.

The folding arm 230 may have a rod shape, and may be pivotally coupled to the housing 210 at the other end facing one end in which the propulsion system 220 is located. First folding arms 231 may be disposed respectively to both sides of a front end of the housing 210, and second folding arms 232 may be disposed respectively to both sides of a rear end of the housing 210. For example, the first folding arm 231 may be pivotably coupled to a front end of the first housing structure 211, about a center of one end 231a. The first folding aim 231 may rotate such that the other end 231b to which the propulsion system 220 is disposed faces a center of the housing 210. A second folding arm 232 may be pivotably coupled to a rear end of the second housing structure 212, about a center of the one end 232a. The second folding arm 232 may rotate such that the other end 232b, to which the propulsion system 220 is disposed, faces the center of the housing 210.

The folding arm 230 may protrude with respect to the housing 210 by a rotation operation, or may be configured such that at least part of the folding arm 230 is inserted in the housing 210. The folding arm 230 may be located radially with respect to the housing 210 by rotating in a protruding direction with respect to the housing 210. When the folding arm 230 is located radially, the unmanned aerial vehicle 200 may fly by thrust provided by the propulsion system 220 disposed to one end of the folding arm 230. The folding arm 230 may be inserted to the housing 210 when the unmanned aerial vehicle 200 is viewed from above when rotating in a direction toward the center of the housing 210. For example, the first folding arm 231 may be at least partially inserted to the first accommodating space 211a of the first housing structure 211. Alternatively or additionally, the second folding arm 232 may be at least partially inserted to the second accommodating space 212a of the second housing structure 212.

The housing 210 may include a communication unit (or a wireless communication circuit), a control unit (or navigation circuit), a sensor unit, the image capturing device 240, and the battery unit 250, which may be coupled to the housing 210 and/or located inside the housing 210.

The communication unit may wirelessly communicate with an external controller (or a remote controller) for controlling the unmanned aerial vehicle 200. The communication unit may receive a control signal from the external controller for controlling the unmanned aerial vehicle 200. The communication unit may transmit information regarding a flight state of the unmanned aerial vehicle 200 to the remote controller.

The control unit (or an electronic speed control (ESC) module) may drive the propulsion system 220 on the basis of a control signal received from the remote controller through the communication unit.

The sensor unit (not shown) may include a gyro sensor capable of measuring angular velocity of the unmanned aerial vehicle 200 in flight, a barometer capable of measuring a pressure change in the air and/or atmospheric pressure, a magnetic sensor (a geomagnetic sensor, a terrestrial magnetism sensor, a compass sensor) capable of measuring a magnetic field of the Earth, an acceleration sensor for measuring acceleration of a flying object, a proximity sensor (including an ultrasonic sensor capable of outputting an ultrasonic wave to measure a distance by measuring a signal reflected from an object) for measuring a proximity status and distance of the object, and/or an optical sensor (an optical flow sensor (OFS)) capable of calculating a location by recognizing a ground terrain or pattern.

The image capturing device 240 may be mounted outside the housing 210 or may be located inside the housing 210. For example, the image capturing device 240 may be disposed at a front end of the first housing structure 211 to capture image or video during flight.

The battery unit 250 may supply power necessary to drive the unmanned aerial vehicle 200. For example, the propulsion system 220, the sensor unit, the image capturing device 240, and the control unit may operate by using the power supplied from the battery unit 250. The battery unit 250 may be detachably coupled to the housing 210. The battery unit 250 may be mounted to the housing 210 in a sliding manner The second housing structure 212 may include an opening 212b to accommodate the battery unit 250 at a rear end. A user may use the unmanned aerial vehicle 200 for a longer time by replacing the battery unit 250.

Figure 3A:
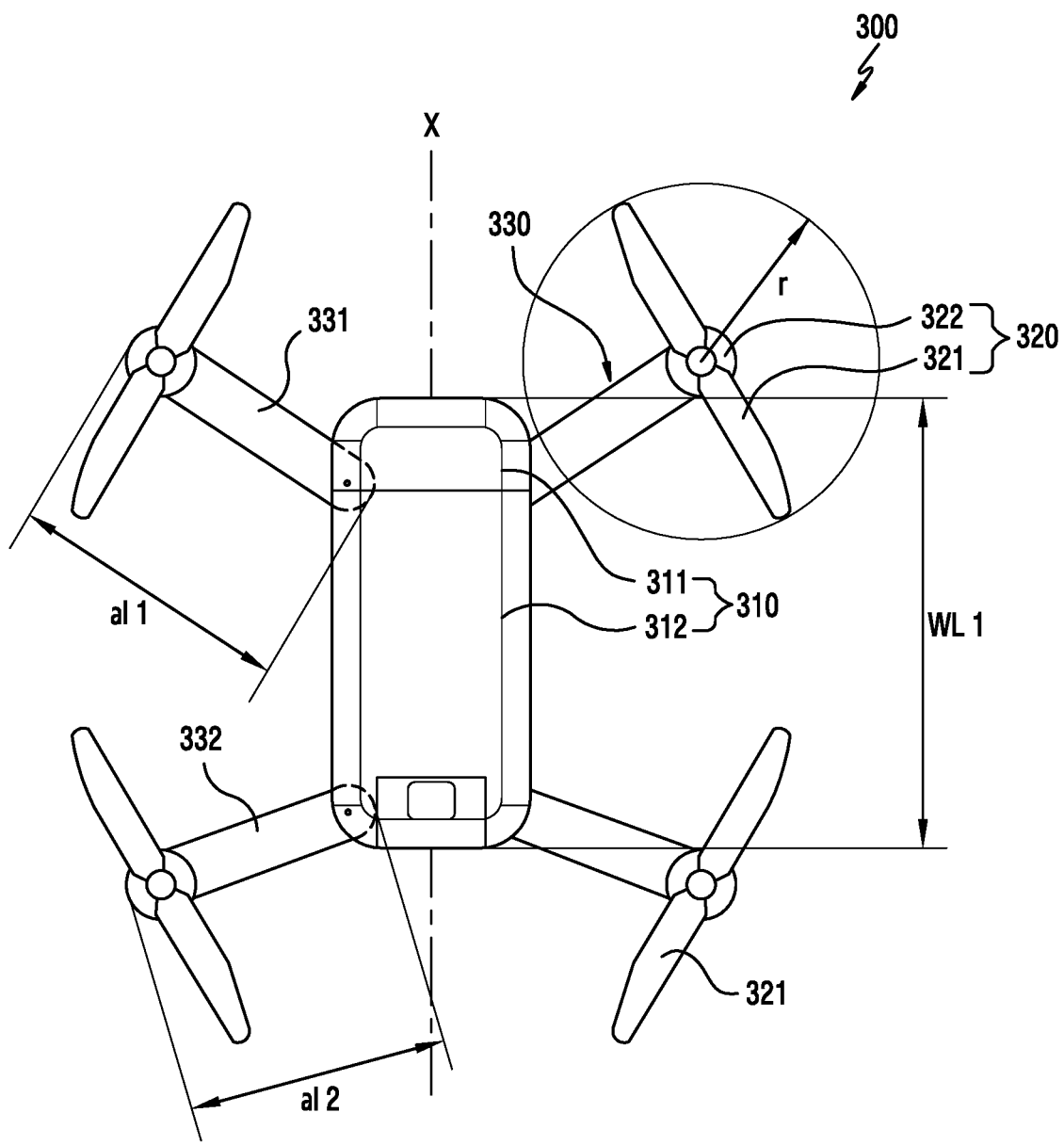
FIG. 3A is a diagram of an unmanned aerial vehicle in a flight state according to an embodiment.

FIG. 3A is a diagram of an unmanned aerial vehicle 300 in a flight state according to an embodiment.

Referring to FIG. 3A, a length of a folding arm 330 may be determined based on a length of a propeller 321. When an unmanned aerial vehicle 300 is in a flight state, the propeller 321 rotates at a high speed to provide thrust. In order to prevent the propeller 321 rotating at the high speed from causing a damage to a housing 310, a center axis of the propeller 321 and a length to the housing 310 must be longer than a rotation radius r of the propeller. A length of a first folding aim 331 disposed to a front end of the unmanned aerial vehicle 300 may be determined as a third length al1 longer than the rotation radius r of the propeller 321. A length of the second folding arm 332 disposed to a rear end of the unmanned aerial vehicle 300 may be determined as a fourth length al2 longer than the rotation radius r of the propeller 321. Each of the third length al1 of the first folding arm 331 and the fourth length al2 of the second folding arm 332 may be determined to have a length longer than half of a first length WL1. When the unmanned aerial vehicle 300 is in the flight state, each of the third length al1 of the first folding arm 331 and the fourth length al2 of the second folding arm 332 may have a length longer than half of the first length WL1. The length of the first folding arm 331 and the length of the second folding arm 332 may be determined not only by the rotation radius r of the propeller 321 but also by factors such as an angle constituted by the housing 310 of the unmanned aerial vehicle 300 and/or a width of the first and second folding arms 331 and 332. The first folding arm 331 and the second folding arm 332 may have the same length or different lengths.

When the unmanned aerial vehicle 300 is in the flight state, a total length of the housing 310 may have a first length WL1 which is less than a sum of the third length al1 of the first folding arm 331 and the third length al2 of the fourth folding arm 332. The housing 310 may have the first length WL1 by slidably moving to overlap with each other along a longitudinal direction (X-axis). The unmanned aerial vehicle 300 may have a relatively short length of the housing 310 in the flight state, thereby concentrating a center of gravity and reducing air resistance to improve flight performance. As described herein, the flight state may be referred to as a first state, a driving state, etc.

Figure 3B:
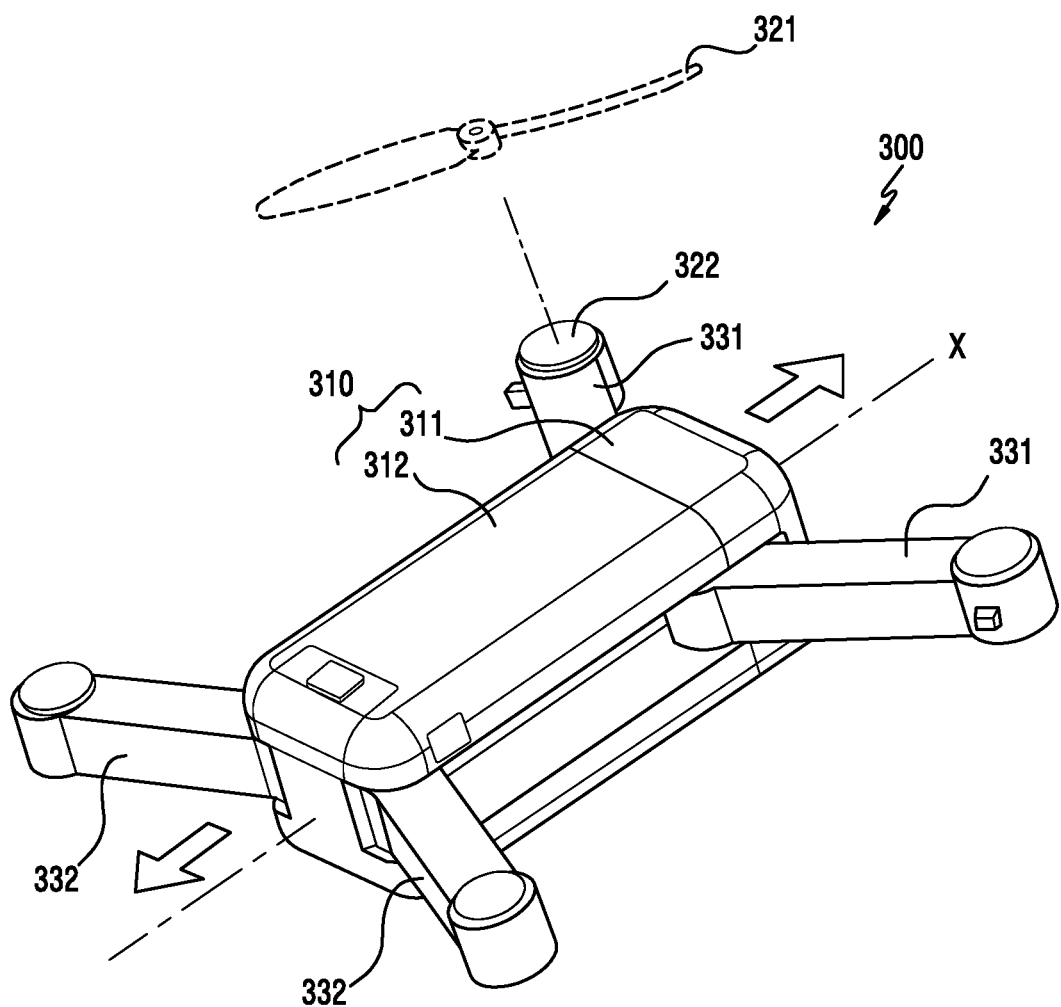
FIGS. 3B, 3C and 3D are diagrams of a transforming process of an unmanned aerial vehicle from a flight state to a storage state according to an embodiment.
Figure 3C:
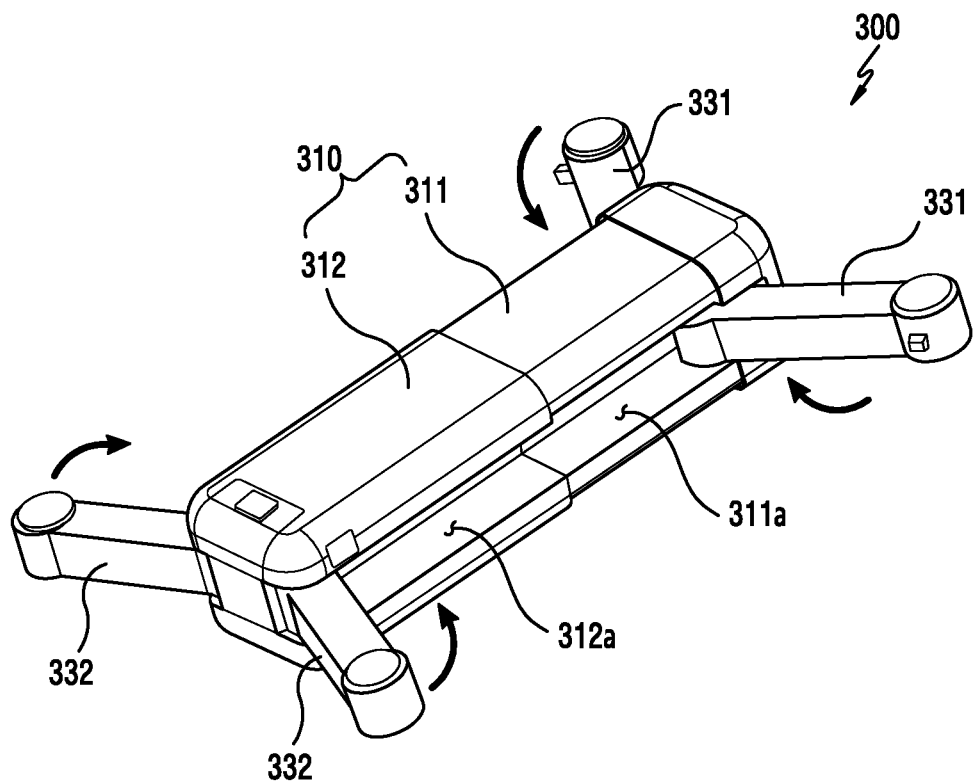
Figure 3D:
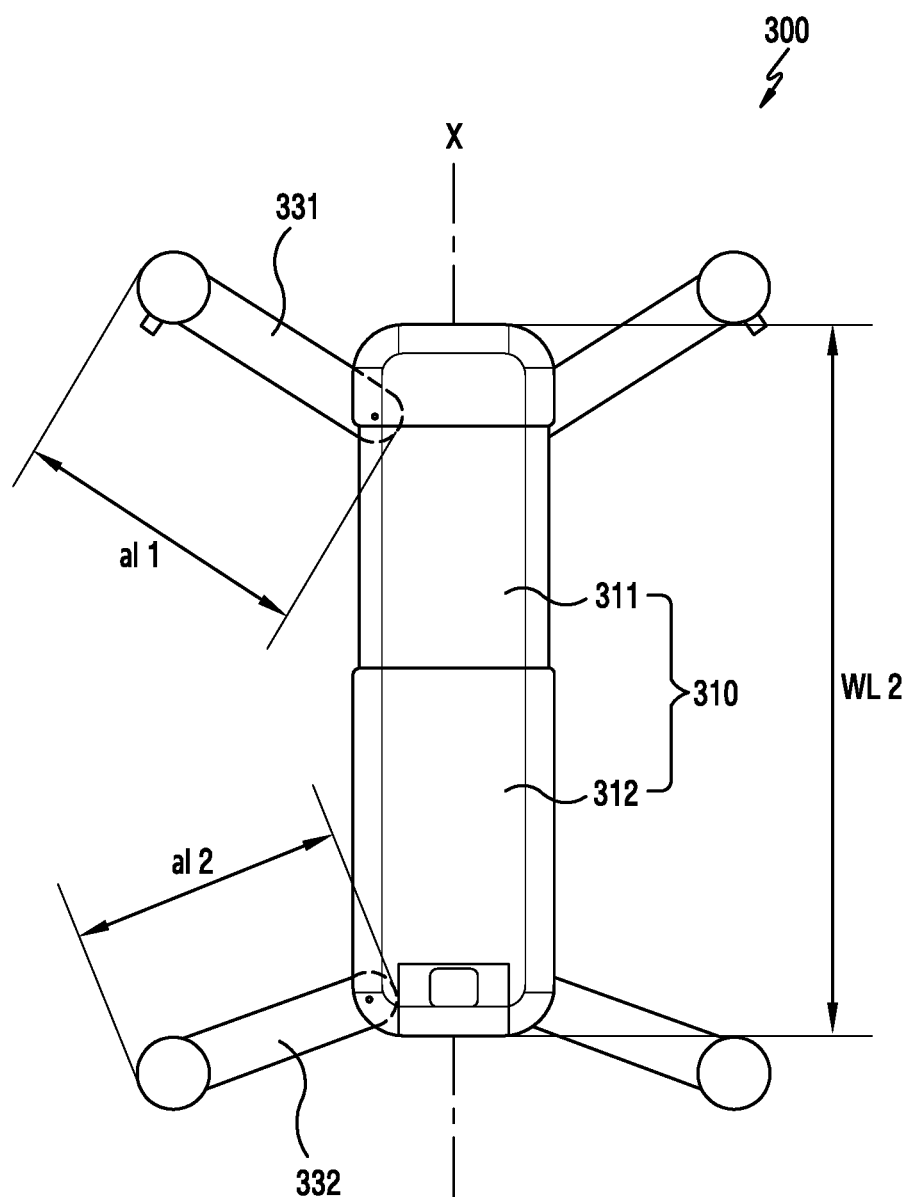

FIGS. 3B-3D are diagrams of a transforming process of an unmanned aerial vehicle according to an embodiment. A transformation process from a flight state to a storage state by a rotation operation of the folding arm 330 and a sliding operation of the housing 310 is shown.

FIG. 3B is a diagram of an unmanned aerial vehicle 300 in a state where the propeller 321 is detached according to an embodiment.

Referring to FIG. 3B, a user may detach the propeller 321 from the unmanned aerial vehicle 300 to carry the unmanned aerial vehicle 300. The propeller 321 may be configured not to be detached. In this case, the propeller 321 may be configured such that each blade is folded about a center to reduce a size of the propeller 321. For example, it may be designed such that a folded propeller is inserted at least partially into an inner portion of the housing 310 together with a folding arm 331 or 332.

When force is applied by a user along a longitudinal direction (X axis) away from the first housing structure 311 and the second housing structure 312, the first housing structure 311 and the second housing structure 312 may slidably move such that a total length is increased.

FIG. 3C and FIG. 3D are diagrams of an unmanned aerial vehicle 300 according to an embodiment.

Referring to FIG. 3C and FIG. 3D, the total length of the unmanned aerial vehicle 300 may have the second length WL2 longer than the first length WL1 by a sliding movement of the housing 310. The second length WL2 may be greater than or equal to a sum of the third length al1 of the first folding arm 331 and the fourth length al2 of the second folding arm 332. When the unmanned aerial vehicle 300 is in a storage state, each of the third length al1 of the first folding arm 331 and the fourth length al2 of the second folding arm 332 may have a length shorter than half of the second length WL2. Since the length of the housing 310 has the second length WL2, a first accommodating space 311a and second accommodating space 312a of the housing 310 may ensure a volume in which at least part of the first folding arm 331 and the second folding arm 311a can be inserted.

The second length WL2 may have a value greater by a specific length than a sum of the first folding arm 331 and the second folding arms 332 to ensure a mounting space of an electronic component disposed to a front end of the housing 310.

Figure 3E:
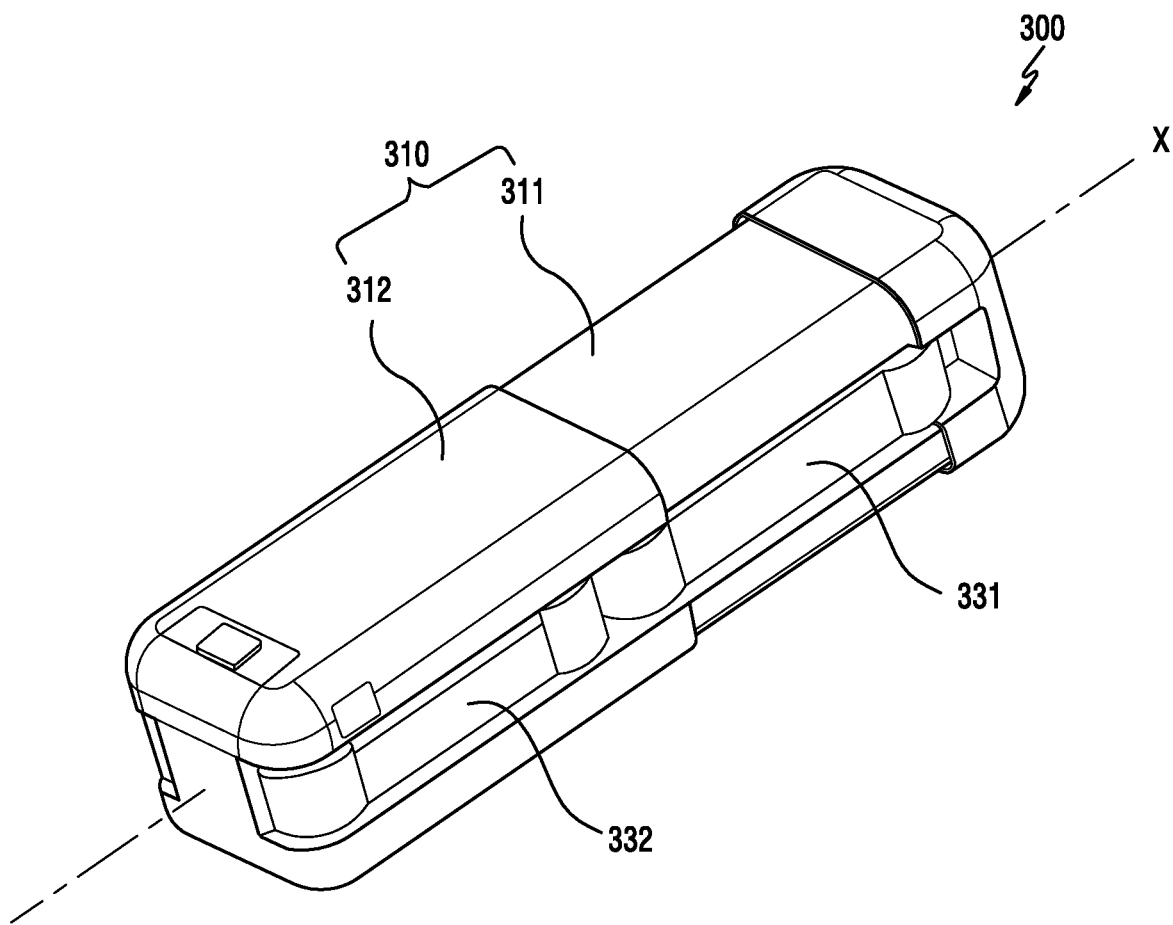
FIG. 3E is a diagram an unmanned aerial vehicle in a storage state according to an embodiment.

FIG. 3E is a diagram of an unmanned aerial vehicle 300 in a storage state according to an embodiment.

Referring to FIG. 3E, when the unmanned aerial vehicle 300 is in a storage state (or a second state), at least part of the plurality of folding arms 330 may be inserted into the housing 310. When the unmanned aerial vehicle 300 in the storage state is viewed from above, the plurality of folding arms 330 may not be visible. A lateral surface of the unmanned aerial vehicle 300 in the storage state may be configured such that the housing 310 and the plurality of folding arms 330 constitute the same outer surface. The unmanned aerial vehicle 300 in the storage state may have a seamless exterior, thereby enhancing esthetics and easiness of storage. As described herein, the storage state may be referred to as a second state, a portable state, a non-driving state, etc.

When a size of a propeller is increased to improve flight performance of the unmanned aerial vehicle, a length of a folding arm for mounting the propeller may also be increased. When the folding arm is configured to be accommodated (or hidden) inside the housing, a total distance of the housing is increased, which leads to re-distribution of a center of gravity of the unmanned aerial vehicle and increase in air resistance, thereby deteriorating flight performance of the unmanned aerial vehicle.

The unmanned aerial vehicle 300 may include the storage state where the total length of the housing 310 is the second length WL2 in order to insert the plurality of folding arms 330 and the flight state where the plurality of folding arms 330 protrude outside the housing 310 and thus the total length of the housing 310 has the first length WL1 shorter than the second length WL2. The unmanned aerial vehicle 300 in the flight state is provided with the housing 310 having a shorter length, thereby increasing concentration of a center of gravity, minimizing air resistance during flight, and increasing an effect of reducing waste of unnecessary volume (e.g., increasing space utilization). For example, the unmanned aerial vehicle 300 may have the effect of improving not only portability and flight performance but also aesthetics and space utilization through a rotation operation of the folding arms 330 and a sliding operation of the housing 310.

The plurality of folding arms 330 may be configured to overlap at least partially with each other when inserted into the housing 310. For example, one end including a propulsion system 320 in the first folding arm 331 and one end including a propulsion system 320 in the second folding arm 332 may be configured to overlap in a direction parallel to a certain rotational axis in an accommodating space of the housing 310. In this case, the total length of the housing 310 may also be shorter by a specific length than a sum of a length of the first folding arm 331 and a length of the second folding arm 332. The portability and the flight performance may be improved by adjusting the total length of the housing 310 in the storage state and the flight state by the sliding operation of the housing 310.

The unmanned aerial vehicle 300 may be transformed between the flight state and storage state of the unmanned aerial vehicle 300. The unmanned aerial vehicle 300 in the flight state may be transformed from the flight state to the storage state through an operation of detaching the propeller 321, an operation of a sliding movement to increase a length of the housing 310, and an operation of inserting (folding) the plurality of folding arms 330 into the housing 310. The unmanned aerial vehicle 300 may be transformed from the storage state to the flight state through an operation of protruding (unfolding) the plurality of folding arms 330 inserted from the housing 310, an operation of performing a sliding movement to decrease the length of the housing 310, and an operation of assembling the propeller 321 to each of the plurality of folding arms 330. The operation of detaching or assembling the propeller 321 may be omitted depending on an assembling configuration of the propeller 321.

Figure 4A:
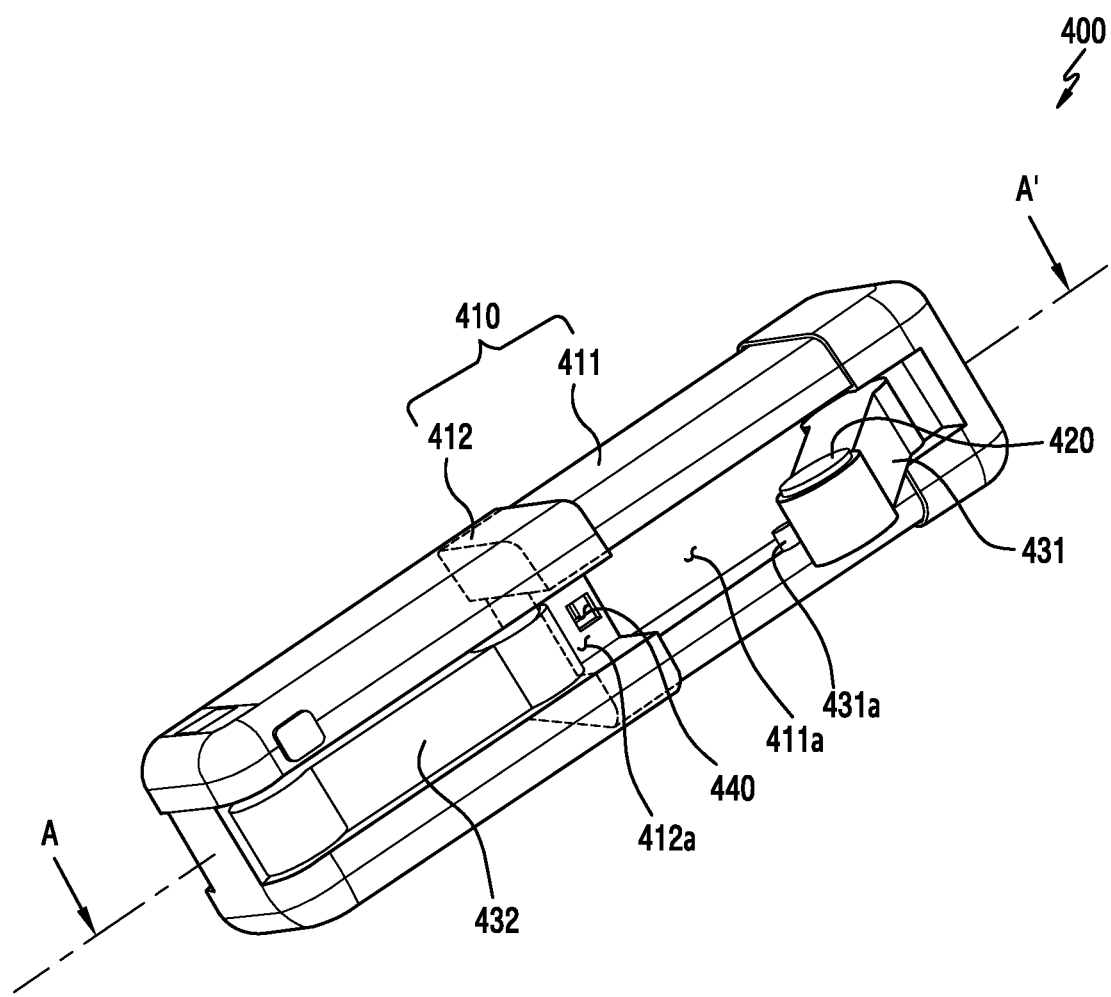
FIG. 4A is a diagram of a locking structure in which an unmanned aerial vehicle is configured to maintain a storage state according to an embodiment.

FIG. 4A is a diagram of a locking structure in which an unmanned aerial vehicle 400 is configured to maintain a storage state according to an embodiment.

Referring to FIG. 4A, due to a rotation operation (or a folding operation) of a first folding arm 431, one end to which a propulsion system 420 of a first folding arm 431 is disposed may be inserted or protrude to a first accommodation space 411a of a first housing structure 411 and a second accommodation space 412a of a second housing structure 412. The one end of the first folding arm 431 may include a fixing hook 431a which protrudes in a direction facing a lateral surface of the first and second accommodating spaces 411a and 412a when the first folding arm 431 is at least partially inserted to the housing 410. The lateral surface of the first and second accommodating spaces 411a and 412a may include a hook hole 440 at a position corresponding to the fixing hook 431a. The hook hole 440 may be configured such that the fixing hook 431 is at least partially or completely inserted when the first housing structure 411 and the second housing structure 412 are located to have a second length WL2. The fixing hook 431a inserted (or fastened) to the hook hole 440 may confine a sliding movement of the first housing structure 411 and the second housing structure 412.

Figure 4B:
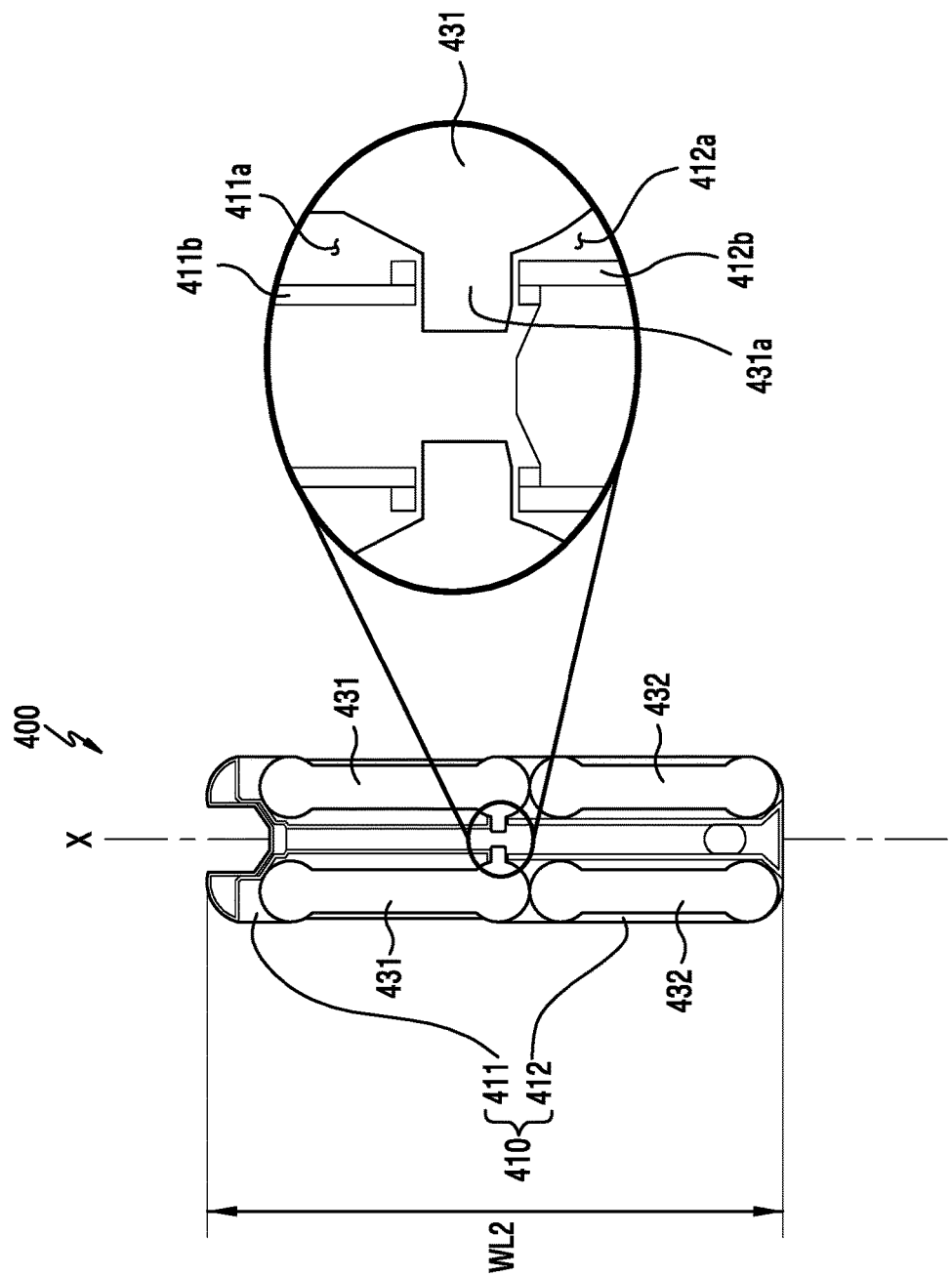
FIG. 4B is a diagram taken along the line A-A' of the unmanned aerial vehicle of FIG. 4A according to an embodiment.

FIG. 4B is a diagram taken along the line A-A' of the unmanned aerial vehicle 400 of FIG. 4A according to an embodiment.

Referring to FIG. 4B, when the unmanned aerial vehicle 400 is in a storage state, a first lateral portion 411b and second lateral portion 412b of the first accommodation space 411a may be located to at least partially overlap. The hook hole 440 may be present in an overlapping region of the first lateral portion 411b and the second lateral portion 412b. The fixing hook 431a of the first folding arm 431 may be inserted and fastened to the hook hole 440, and the fixing hook 431a may confine a sliding movement of the first lateral portion 411b and the second lateral portion 412b. The fixing hook 431a of the first folding arm 431 and the hook hole 440 present in the first housing structure 411 and the second housing structure 412 may constitute the locking structure. The unmanned aerial vehicle 400 may maintain a storage state where the housing 410 has the second length WL2 due to the locking structure. The sliding movement of the first housing structure 411 and the second housing structure 412 may be confined by the locking structure. This may provide structural reliability of the entire housing during the unmanned aerial vehicle 400 is carried.

The locking structure may be released when a user rotates the first folding arm 431 to protrude from the housing 410. When the first folding arm 431 rotates to protrude, the fixing hook 431a may be detached from the hook hole 440, and thus a sliding movement of the first housing structure 411 and the second housing structure 412 may become free in a longitudinal direction (X-axis).

Figure 5A:
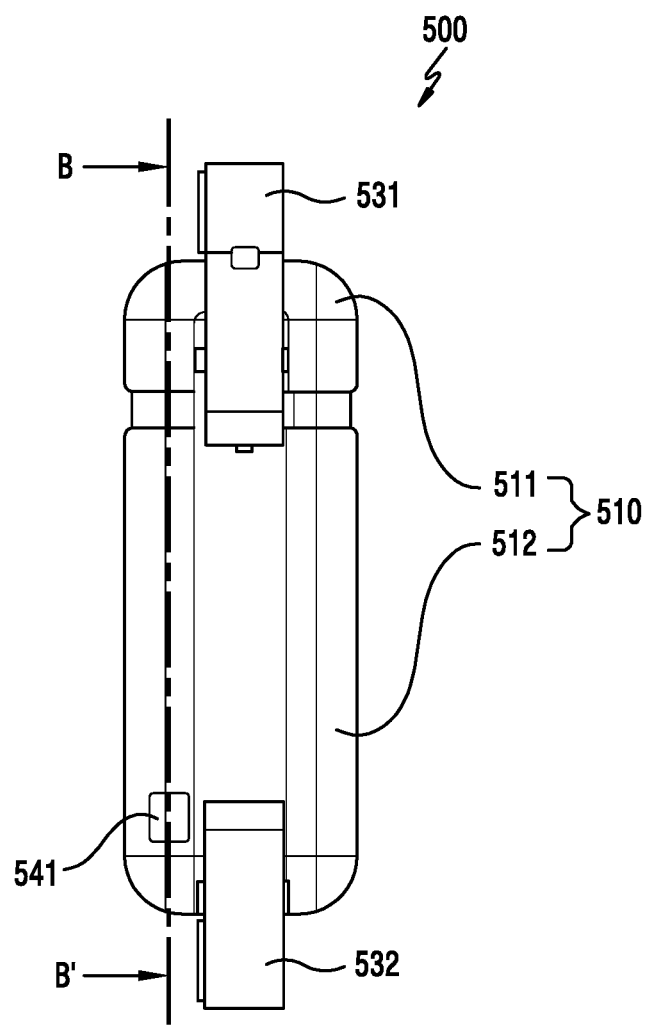
FIG. 5A is a diagram an unmanned aerial vehicle according to an embodiment.
Figure 5B:
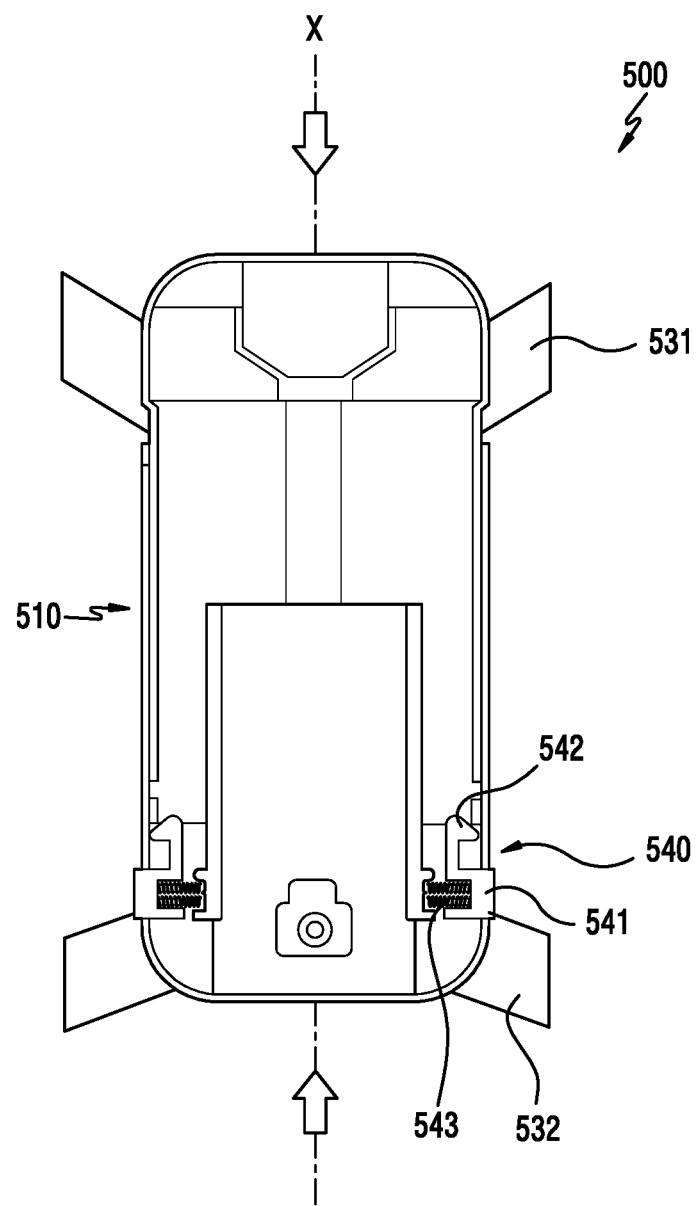
FIG. 5B is a diagram taken along the line B-B' of the unmanned aerial vehicle of FIG. 5A according to an embodiment.
Figure 5C:
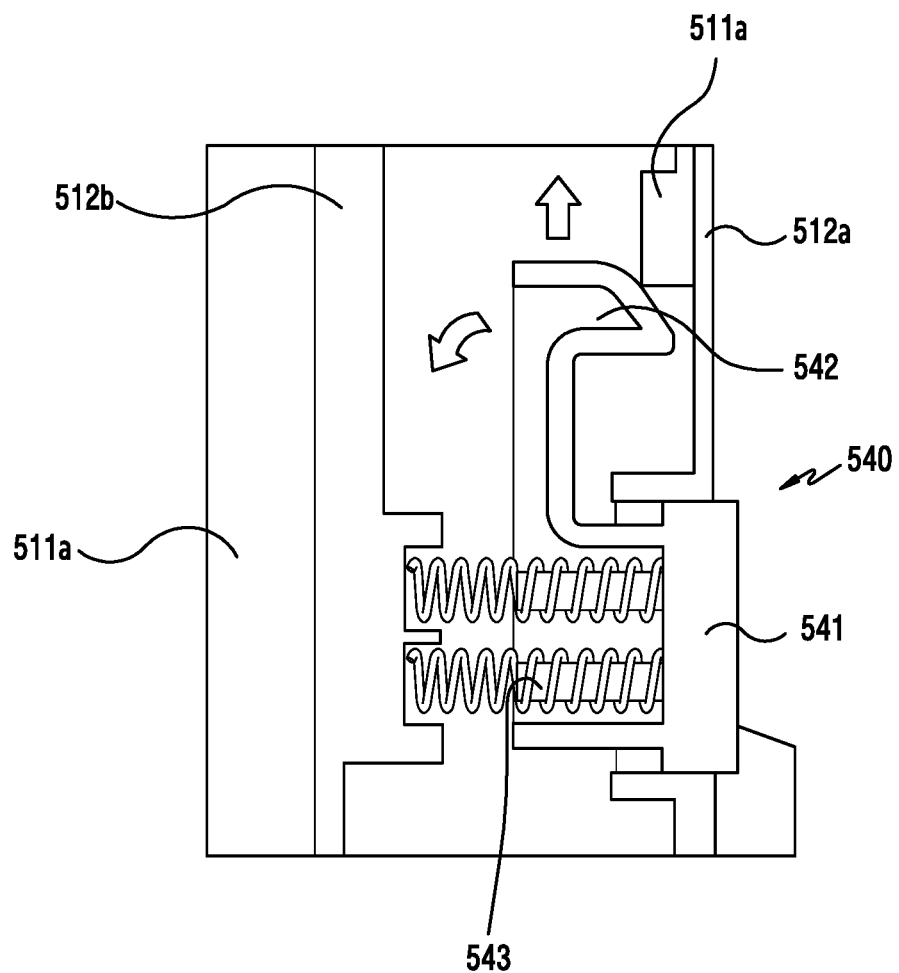
FIG. 5C and FIG. 5D are diagrams of a locking structure of an unmanned aerial vehicle according to an embodiment.
Figure 5D:
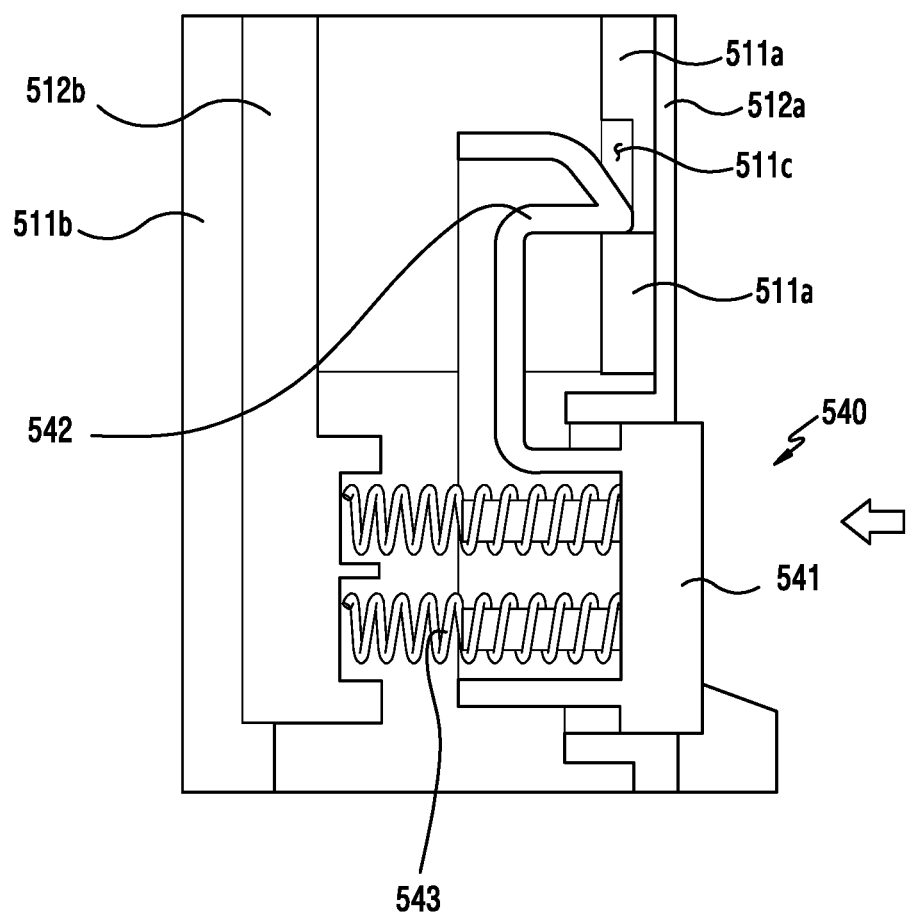

FIG. 5A is a diagram of an unmanned aerial vehicle 500 according to an embodiment. FIG. 5B is a diagram taken along the line B-B' of the unmanned aerial vehicle 500 according to an embodiment. FIG. 5C and FIG. 5D are diagrams of a locking structure of the unmanned aerial vehicle 500 according to an embodiment.

Referring to FIGS. 5A-5D, an operation in which a housing 510 of an unmanned aerial vehicle 500 slidably moves from a storage state to a flight state is illustrated according to an embodiment. The unmanned aerial vehicle 500 may include a locking structure configured to maintain a flight state. A sliding movement of a first housing structure 511 and a second housing structure 512 may be confined by a locking structure 540 included in a rear end of the second housing structure 512. A button 541 of the locking structure 540 may be disposed to be exposed to an exterior of the second housing structure 512, and the confinement of the sliding movement may be released when a user presses the button 541.

An outer lateral portion 511a of the first housing structure 511 may be slidably coupled in a longitudinal direction (X-axis) so as to be inserted in a space between an outer lateral portion 512a and inner lateral portion 512b of the second housing structure 512. The inner lateral portion 511a of the first housing structure 511 may provide a guiding role to facilitate a sliding movement of the first housing structure 511 and the second housing structure 512.

The locking structure 540 disposed to a rear end of the second housing structure 512 may include the button 541, a fixing hook 542, and an elastic member 543. The elastic member 543 may be configured such that the button 541 and the fixing hook 542 apply elastic force toward the lateral portion 512a of the second housing structure 512. The button 541 may protrude from the lateral portion 512a by the elastic member 543. The elastic member 543 may include a spring.

The fixing hook 542 may be configured to protrude toward the outer lateral portion 512a so as to interfere with a sliding movement trajectory of the outer lateral portion 511a of the first housing structure 511. In a direction in which the housing 510 slidably moves to have a first length, a portion where the fixing hook 542 is in contact with the outer lateral portion 511a of the first housing structure 511 is constructed as an inclined portion, and thus a sliding movement is not confined by bending-transformation of the fixing hook 542.

When the first housing structure 511 and the second housing structure 512 slidably move and thus the unmanned aerial vehicle 500 is transformed to a flight state (or the total length of the housing 510 is a first length), the fixing hook 542 of the locking structure 540 may be fastened to a stopping groove 511c disposed to the outer lateral portion 511a of the first housing structure 511. When the fixing hook 542 is fastened to the stopping groove 511c, in a direction in which the housing 510 slidably moves to have a second length, a portion where the fixing hook 542 is in contact with the outer lateral portion 511a of the first housing structure 511 may be constructed as a stepped portion, thereby confining a sliding movement. The unmanned aerial vehicle 500 may maintain the flight state where of the housing 510 has the first length WL1 by the locking structure 540. The sliding movement of the first housing structure 511 and the second housing structure 512 may be confined in the flight state of the unmanned aerial vehicle 500. This may provide structural reliability of the entire housing during the flight of the unmanned aerial vehicle 500.

The locking structure 540 may be released when a user presses the button 541. As the button 541 is pressed, the fixing hook 542 may be moved in an inner direction of the second housing structure 512 and thus is detached from the stopping groove 511c against elastic force of the elastic member 543, and a sliding movement of the first housing structure 511 and the second housing structure 512 may become free in a longitudinal direction (X-axis).

Figure 6A:
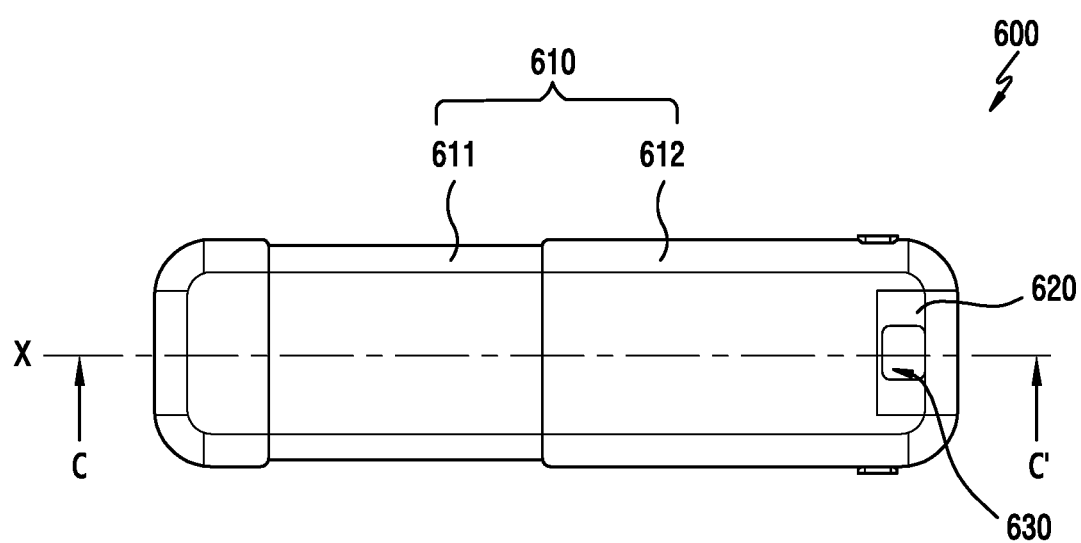
FIG. 6A is a diagram of an unmanned aerial vehicle according to an embodiment.
Figure 6B:
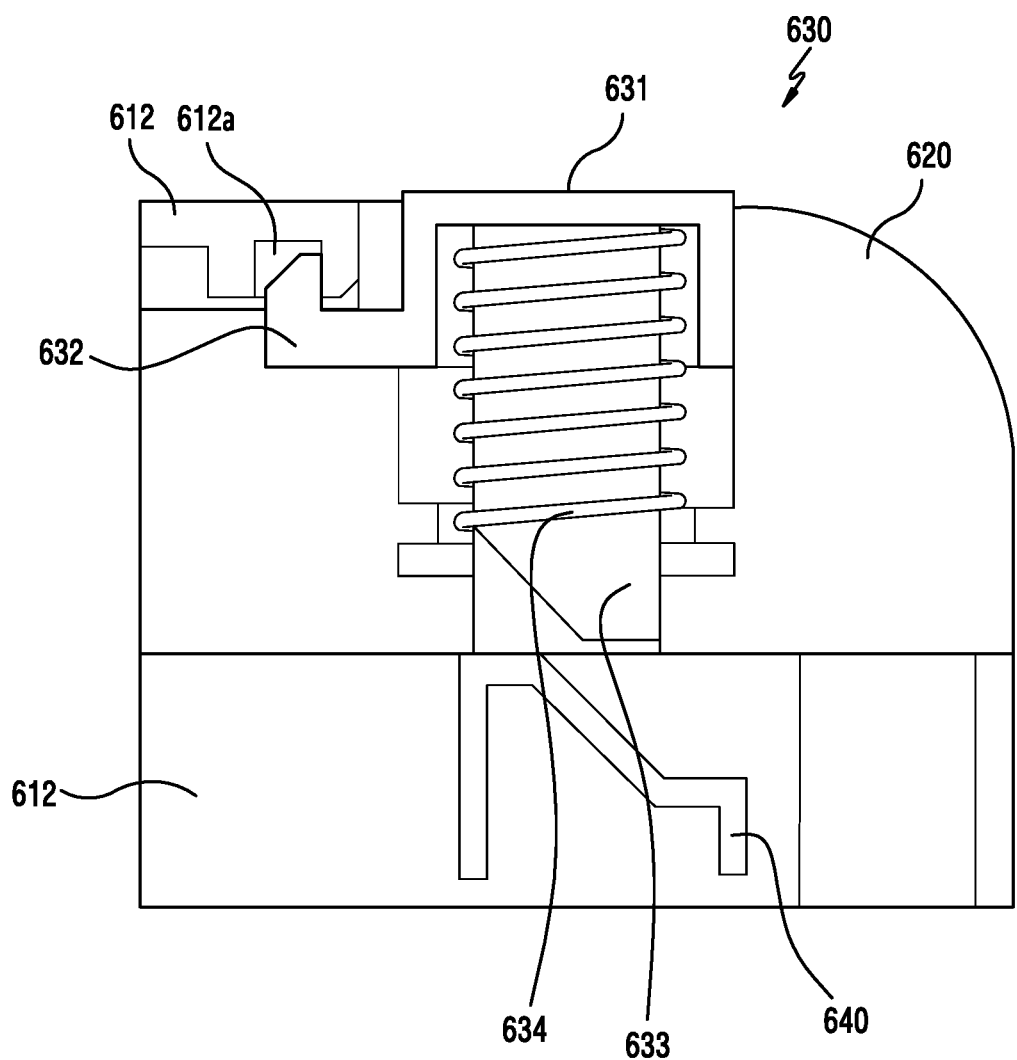
FIGS. 6B, 6C and 6D are diagrams of a fastening structure of an unmanned aerial vehicle according to an embodiment.
Figure 6C:
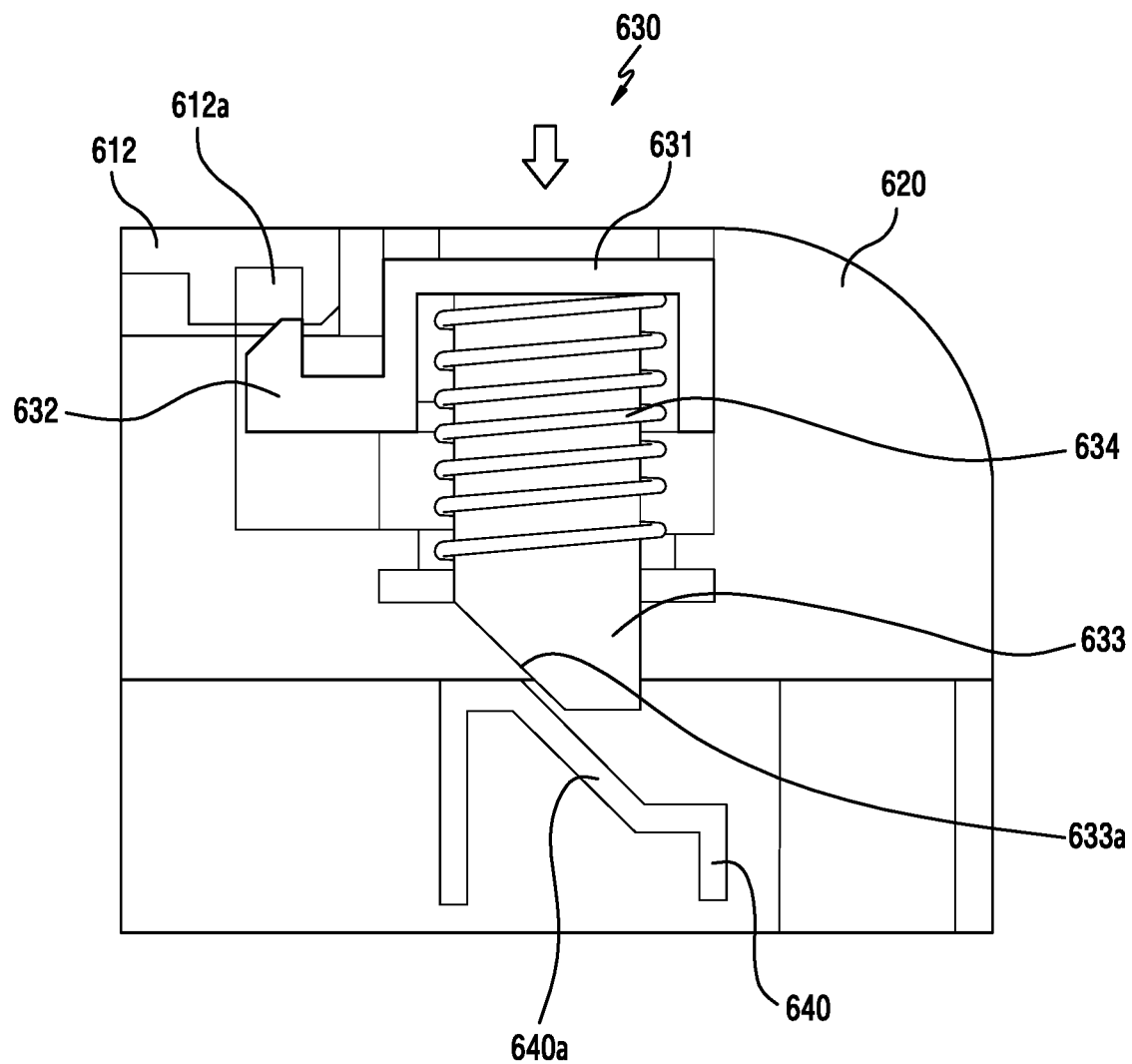
Figure 6D:
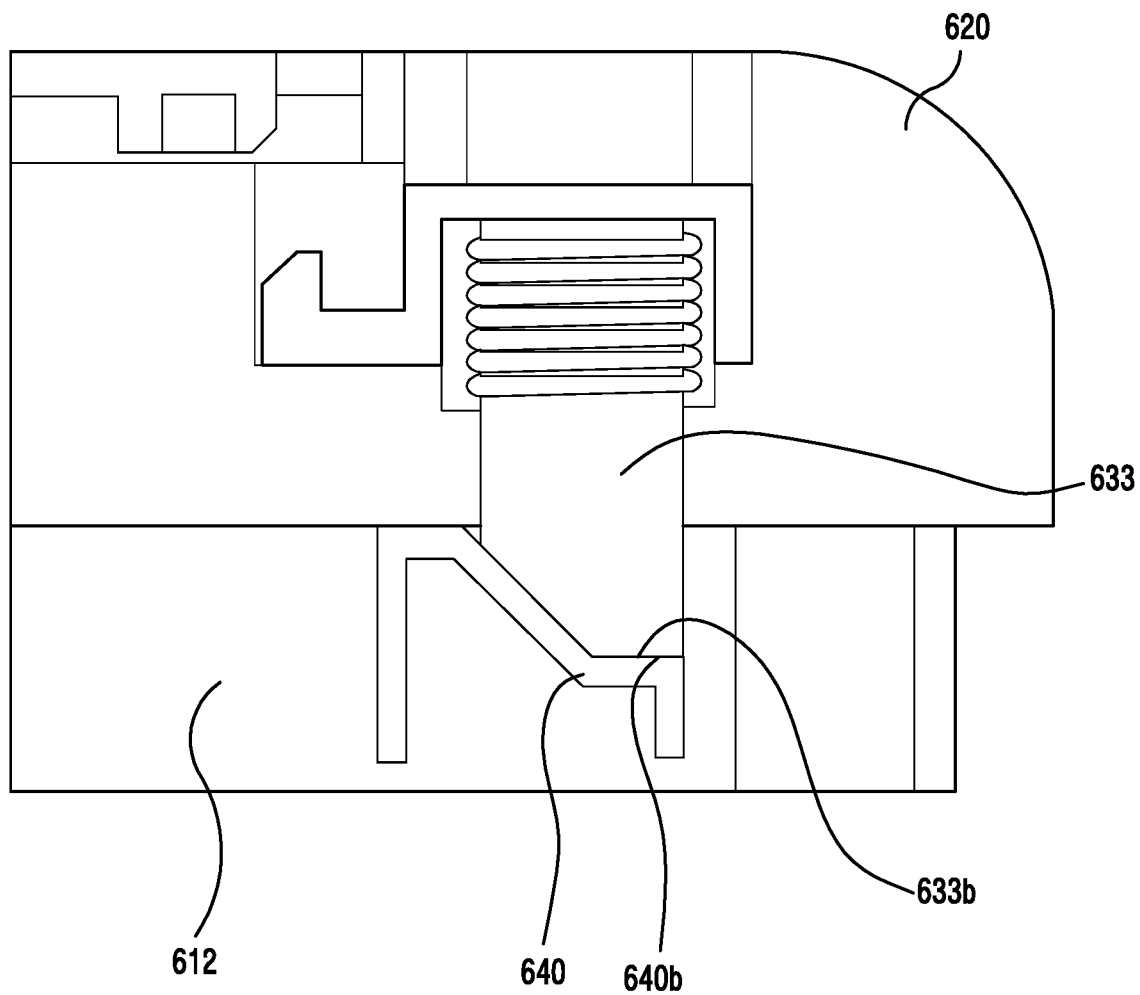

FIG. 6A is a diagram of an unmanned aerial vehicle 600 according to an embodiment. FIGS. 6B-6D are diagrams of a fastening structure along the line C-C' of the unmanned aerial vehicle 600 according to an embodiment.

Referring to FIGS. 6A-6D, a battery unit 620 may be detachably coupled to a housing 610. The battery unit 620 may be coupled to a second housing structure 612 in a sliding manner according to a longitudinal direction (X-axis). The battery unit 620 may include a fastening structure 630 which assists the fastening to the second housing structure 612.

The fastening structure 630 may include a button 631 included in the battery unit 620, a fixing hook 632, a guide shaft 633, an elastic member 634, and a guide member 640, which may be included in the second housing structure 612. The button 631 may be disposed to be exposed to an upper surface of the battery unit 620. The fixing hook 632 coupled to the button 631 may be fastened to a stopping groove 612a disposed to an inner surface of the second housing structure 612 to confine a sliding movement of a direction (a longitudinal direction, X-axis) in which the battery unit 620 is detached from the second housing structure 612. The elastic member 634 may be disposed to surround a guide shaft extended in a direction perpendicular to the longitudinal direction (X-axis). The elastic member 634 may be disposed such that the button 631 and the fixing hook 632 apply elastic force in a vertical direction facing an upper surface of the battery 620. The button 631 may maintain a state of protruding from the upper surface of the battery unit 620 by the elastic member 634.

Referring to FIG. 6C, when the button 631 is pressed in a vertical direction against elastic force of the elastic member 634, the fixing hook 632 coupled (or interlocked) with the button 631 may be detached from the stopping groove 612a. With the detachment of the fixing hook 632, a sliding movement of the battery unit 620 may become free with respect to the second housing structure 612a. When the button 631 pressed by the specific length, the guide shaft 633 extended to a lower portion of the button 631 may be guided to the guide member 640 included in the second housing structure 612. An end of the guide shaft 633 may include a first inclined portion 633a, and an upper surface of the guide member 640 may include a second inclined portion 640a. The first inclined portion 633a and the second inclined portion 640a may slidably move in contact with each other, and thus the guide shaft 633 may be retracted in a rear direction of the battery unit 620.

Referring to FIG. 6D, when the button 631 is pressed by up to the final depth, the battery unit 620 may slidably move by a specific length in a direction away from the second housing structure 612 in such a manner that the guide shaft 633 included in the battery unit 620 is guided by the guide member 640 included in the second housing structure 612. Even if the button 631 is pressed only in a direction perpendicular to a sliding direction, the battery unit 620 may slidably move in a backward direction of the battery unit 620 with respect to the second housing structure 612 due to the guide shaft 633 and guide member 640 included in the fastening structure 630. The fastening structure 630 of the battery unit 620 may provide easy replacement of the battery unit 620.

The guide shaft 633 may include a first flat portion 633b extended from the first inclined portion 633a at an end thereof. The guide member 640 may include a second flat portion 640b extended from the second inclined portion 640a. When the first inclined portion 633a and the second inclined portion 640b are in contact with each other, the button 631 of the fastening structure 630 may no longer be pressed. The first and second flat portions 633b and 640b of the fastening structure 630 may provide a stopper function of pressing the button 631.

Figure 7A:
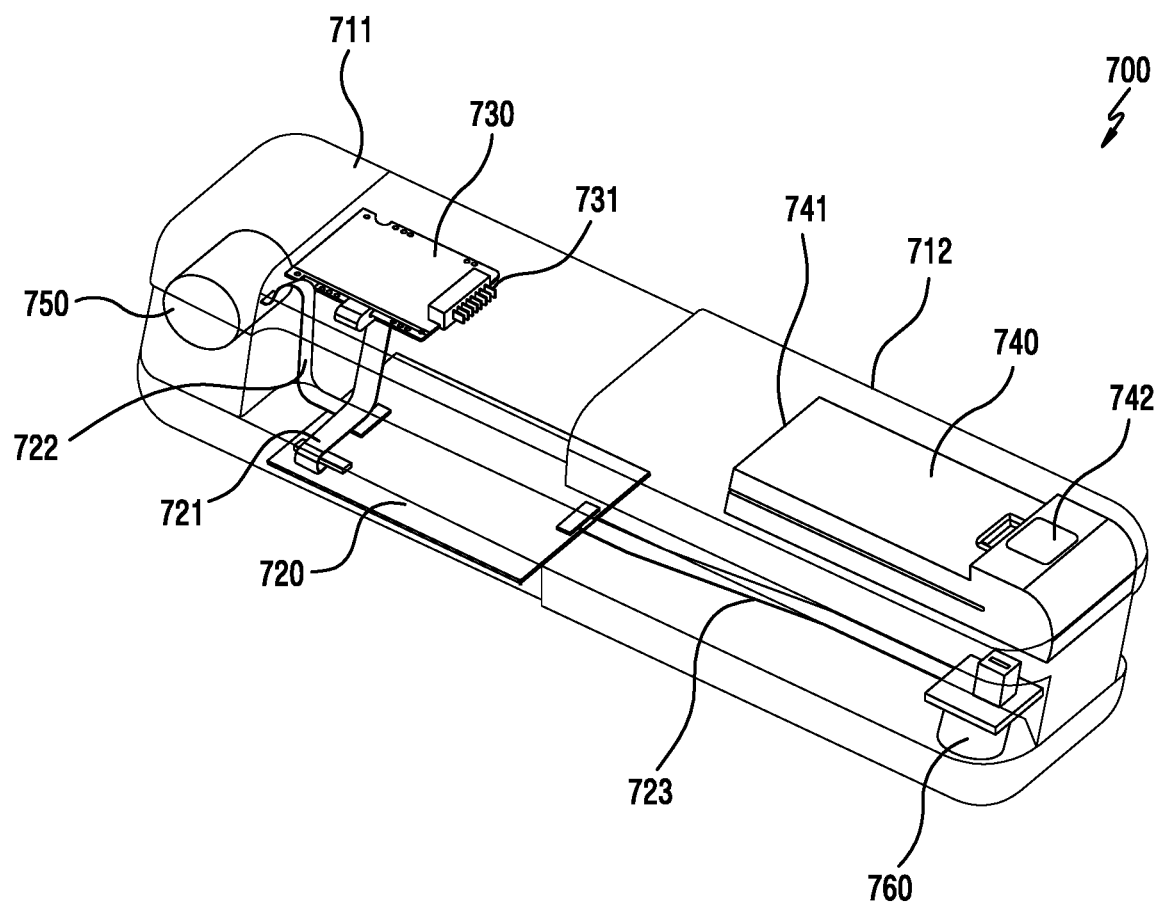
FIG. 7A is a diagram of an unmanned aerial vehicle according to an embodiment.

FIG. 7A is a diagram of an unmanned aerial vehicle 700 according to an embodiment.

Referring to FIG. 7A, an unmanned aerial vehicle 700 may have various electronic components such as a main board 720, an ESC board 730 (or an ESC module, a control unit), a battery unit 740, an image capturing device 750, and a sensor part 760, which are mounted to an inner space of the housing 710. The various electronic components may be disposed at any suitable position in consideration of weight balance of the unmanned aerial vehicle 700.

The main board 720, the ESC board 730, and the image capturing device 750 may be disposed to a first housing structure 711. The main board 720 may have at least one processor mounted thereon, and may be disposed to a lower portion of the first housing structure 711. The ESC board 730 may be electrically coupled to a plurality of thrust systems (not shown) of the unmanned aerial vehicle 700 to provide power, may operate to control the thrust system, and may be disposed to an upper portion of the first housing structure 711. The image capturing device 750 may be disposed to be exposed at least partially to a front end of the unmanned aerial vehicle 700 so that the unmanned aerial vehicle 700 provides an image or video capturing function during flight. The main board 720 and the ESC board 730 may be coupled by a first flexible printed circuit board 721. The main board 720 and the image capturing device 750 may be coupled by a second flexible printed circuit board 722.

The battery unit 740 and the sensor unit 760 may be disposed to a second housing structure 712. The battery unit 740 may be disposed to an upper portion of the second housing structure 712 by being detachably coupled in a sliding manner The sensor unit 760 may include an ultrasonic sensor or the like for acquiring various states of the unmanned aerial vehicle 700, such as information of flight altitude, and may be disposed to a lower portion of the second housing structure 712. The sensor unit 760 may be coupled to the main board 720 by a third flexible printed circuit board 723.

The battery unit 740 may be configured to be coupled (e.g., electrically coupled, physically coupled, etc.) to or detached from the main board 720 or the ESC board 730 by a sliding operation of the housing 710. The battery unit 740 may supply power to the unmanned aerial vehicle 700 or cut off the power by the sliding operation.

Figure 7B:
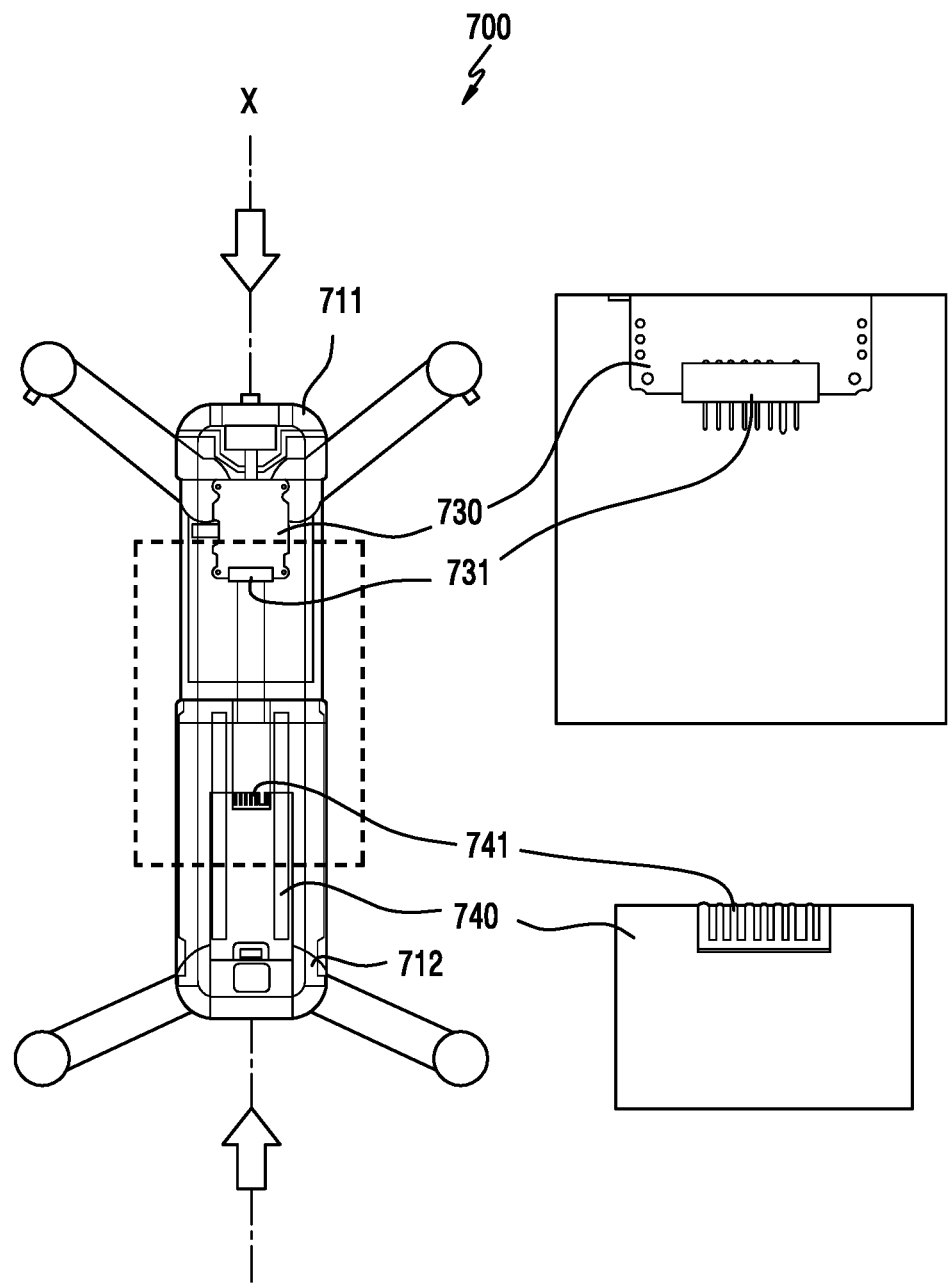
FIG. 7B is a diagram of an unmanned aerial vehicle in a state where power is not supplied according to an embodiment.
Figure 7C:
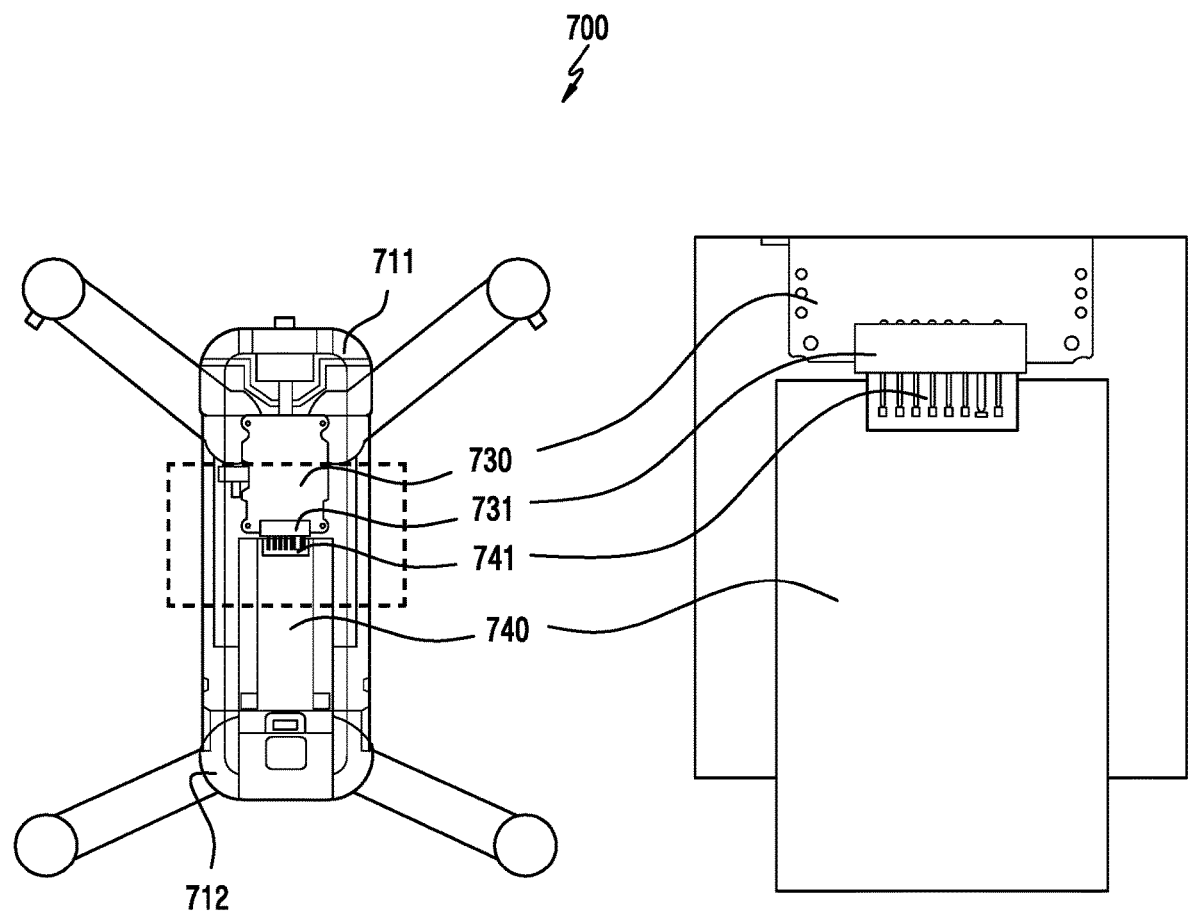
FIG. 7C is a diagram of an unmanned aerial vehicle in a state where power is not supplied according to an embodiment.

FIG. 7B is a diagram the unmanned aerial vehicle 700 in a state where power is not supplied according to an embodiment FIG. 7C is a diagram of the unmanned aerial vehicle in a state where power is not supplied according to an embodiment.

Referring to FIG. 7B and FIG. 7C, in a storage state of the unmanned aerial vehicle 700 or in a state where the first housing structure 711 and the second housing structure 712 are located such that a total length thereof is a second length WL2, an electrical/physical connection with the ESC board 730 may be disconnected in the battery unit 740, and thus power supply for the unmanned aerial vehicle 700 may be cut off.

The ESC board 730 and the battery unit 740 may be disposed respectively to the first housing structure 711 and the second housing structure 712 so as to be electrically/physically coupled by a sliding operation of the housing 710. The ESC board 730 may include a plug (or male connector) 731, and the battery unit 740 may include a socket (or female connector) 741. The plug 731 and the socket 741 may be disposed at a position corresponding to a sliding movement trajectory. As shown in FIG. 7B, the ESC board 730 and the battery unit 740 may be disposed inside the housing 710 substantially in parallel along a longitudinal direction (X-axis) of the unmanned aerial vehicle 700. As shown in FIG. 7C, the ESC board 730 and the battery unit 740 may be disposed inside the housing 710 substantially at the same height.

Figure 7D:
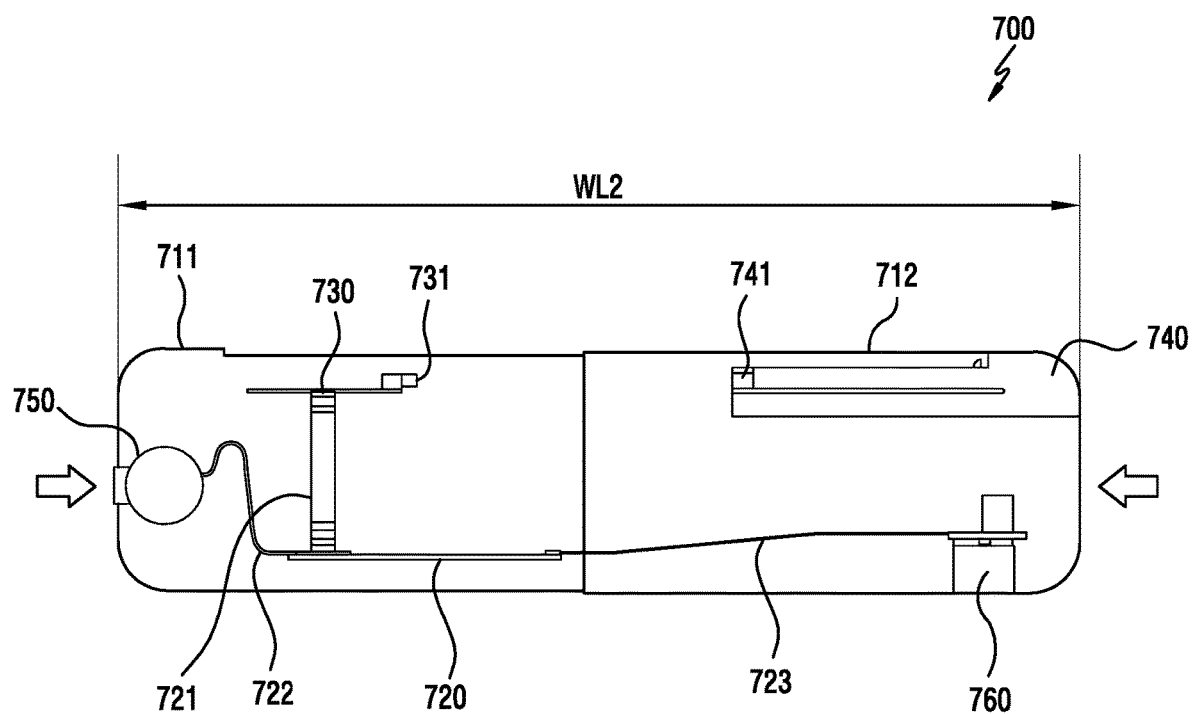
FIG. 7D is a diagram of an unmanned aerial vehicle to which power is not supplied according to an embodiment.
Figure 7E:
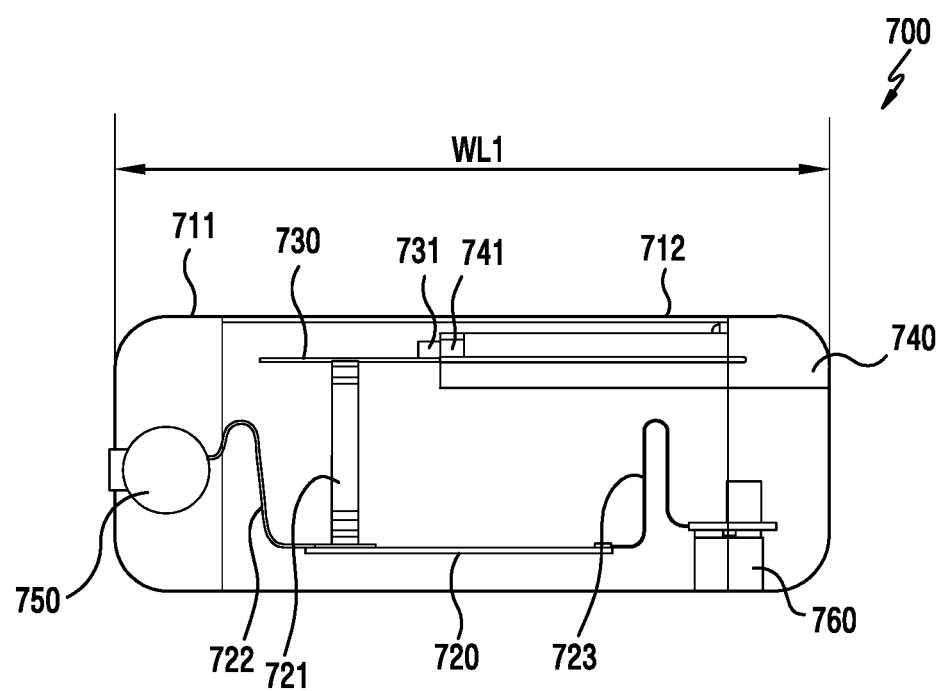
FIG. 7E is a diagram of an unmanned aerial vehicle to which power is supplied according to an embodiment.

FIG. 7D is a diagram the unmanned aerial vehicle 700 according to an embodiment. FIG. 7E is a diagram of the unmanned aerial vehicle 700 to which power is supplied according to an embodiment.

Referring to FIG. 7D and FIG. 7E, in a flight state of the unmanned aerial vehicle 700 or in a state where the first housing structure 711 and the second housing structure 712 are located such that a total length of the housing 710 is a first length WL1, the battery unit 740 may supply power to the unmanned aerial vehicle 700 by being electrically/physically coupled to the ESC board 730.

The battery unit 740 may supply power to the unmanned aerial vehicle 700 by a connection of the socket 741 of the battery unit 740 and the plug 731. The electronic control module board 730 on which the plug 731 is mounted may be electrically coupled to the main board 720. The main board 720 may be electrically coupled to the image capturing device 750 and the sensor unit 760 to supply power to various electronic components of the unmanned aerial vehicle 700.

The battery unit 740 and the ESC board 730 may be electrically/physically separated in a storage state, and when transitioning to a flight state, may be electrically/physically coupled to each other while a total length of the housing 710 is decreased, thereby supplying power to the unmanned aerial vehicle 700. The connection of the battery connector (e.g., the plug 731 and the socket 741) may transition between a cut-off state and a connected state by a sliding movement of the housing 710. The power supply/cut-off mechanism may prevent unnecessary power consumption of the unmanned aerial vehicle 700 and a safety accident caused by an unintentional operation of the unmanned aerial vehicle 700, which may occur in case of regular power supplying.

A component disposed to the first housing structure 711 and a component disposed to the second housing structure 712 may maintain an electrical/physical connection to a flexible printed circuit board despite of a sliding operation of the housing 710. In a flight state where the housing 710 has a first length WL1, since a distance between the first housing structure 711 and the second housing structure 712 is decreased, it is possible to compensate for a length which is decreased when the third flexible printed circuit 723 for connecting the main board 720 and the sensor unit 760 is at least partially folded. When the unmanned aerial vehicle 700 is transformed to the storage state, a distance between the first housing structure 711 and the second housing structure 712 is increased since the housing 710 has a second length WL2, it is possible to compensate for a length increased when the third flexible printed circuit board 723 is unfolded.

Figure 8:
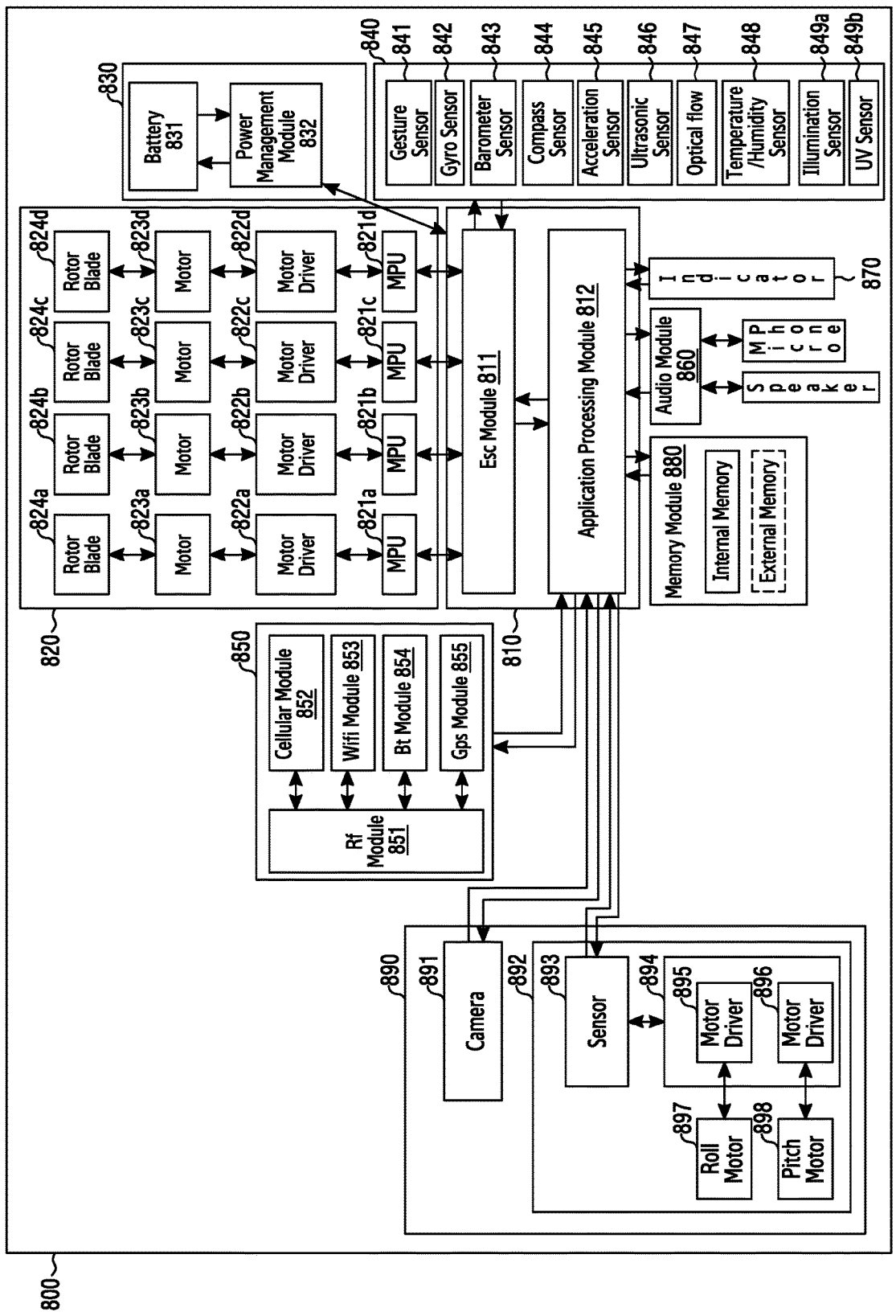
FIG. 8 is a diagram of an unmanned aerial vehicle according to an embodiment.

FIG. 8 is a diagram an unmanned aerial vehicle 800 according to an embodiment.

Referring to FIG. 8, an unmanned aerial vehicle 800 includes a processor 810, a movement module 820, a battery module 830, a sensor module 840, a communication module 850, an audio module 860, an indicator 870, a memory module 880 and/or a camera module 890. Although the unmanned aerial vehicle 800 is depicted as a quad-rotor vehicle, but alternative configurations may be utilized.

The processor 810 includes at least an ESC (or a movement control module) 801 and an application processing module 802. The processor 810 may perform computations or data processing for control and/or communication of at least one different constitutional elements of the unmanned aerial vehicle 800.

The ESC module 811 may control a movement of the unmanned aerial vehicle 800 by using position and posture information of the unmanned aerial vehicle 800 or an operating signal of a controller. In addition, the ESC module 811 may include a flight control module and a posture control module. The flight control module may control a roll, pitch, yaw, throttle, or the like of the unmanned aerial vehicle 800 on the basis of the position and posture information acquired in the posture control module and the operating signal of the controller. The ESC module 811 may control a hovering operation, and may allow the unmanned aerial vehicle 800 to fly to up to a target point on the basis of position information provided by the application processing module 812 and the operating signal of the controller.

The application processing module 812 may receive state information of the unmanned aerial vehicle 800 and provide it to the controller. Alternatively, the state information of the unmanned aerial vehicle 800 may be informed to a user under the control of the audio module 860 or a display unit or the like. In addition, when a camera device is mounted, an automatic image capturing mode may be controlled based on received image capturing information. The image capturing information may include image capturing position information. The image capturing information may include composition information and/or camera control information in addition to the image capturing position information. The image capturing information may be image capturing information based on user preference in the electronic device. The application processing module 812 may transfer the image capturing position information to the ESC module 811 to control a movement of the unmanned aerial vehicle 800. The application processing module 812 may transfer driving and/or camera control information to the camera device to control an image capturing composition and angle of a camera and a subject.

When the unmanned aerial vehicle 800 is a quad-rotor, the movement module 820 (or a propulsion system) may include microprocessor units (MPUs) 821a to 821d, motor driver circuits 822a to 822d, motors 823a to 823d, and rotor blades 824a to 824d. The MPUs 821a to 821d may output control data for rotating the respective corresponding rotary blades 824a to 824d on the basis of an operating signal output from the ESC module 811. The motor driving units 822a to 822d may output motor control data output from the MPUs 821a to 821d by converting it to a driving signal. The motors 823a to 823d may control a rotation of the corresponding rotor blades 824a to 824d on the basis of a driving signal of the respective corresponding motor drivers 822a to 822d.

The battery module 830 includes a battery 831 and a power management module 832. The power management module 832 may supply power to the unmanned aerial vehicle 800 and manage the supplied power. The power management module 832 may include a power management integrated circuit (PMIC), a charging IC, or a battery gauge. The PMIC may have a wired charging type and/or a wireless charging type. The wireless charging type may include a magnetic resonance type, a magnetic induction type, and an electromagnetic type, and may further include an additional circuit for wireless charging a coil loop, a resonant circuit, a rectifier, or the like. The battery gauge may measure remaining capacity of the battery and a voltage, current, or temperature during charging. The battery 831 may include a rechargeable battery and/or a solar battery.

The battery module 830 may be electrically/physically coupled to processor 810 to supply power. The battery module 830 may be electrically/physically coupled to the ESC module 811 of the processor 810. The electrical/physical connection may be configured to be coupled or separated by a sliding operation of a housing. The power supply/cut-off mechanism may prevent unnecessary power consumption of the unmanned aerial vehicle 800 and a safety accident caused by an unintentional operation of the unmanned aerial vehicle 800, which may occur in case of regular power supplying.

The sensor module 840 may include some or all of a gesture sensor 841 capable of sensing a motion and/or gesture of a subject, a gyro sensor 842 capable of measuring angular velocity of the unmanned aerial vehicle 100 in flight, a barometer 843 capable of measuring a pressure change in the air and/or atmospheric pressure, a geomagnetic sensor (terrestrial magnetism sensor, compass sensor) 844 capable of measuring a magnetic field of the Earth, an acceleration sensor 845 for measuring acceleration of the unmanned aerial vehicle 800 in flight, an ultrasonic sensor 846 capable of outputting an ultrasonic wave to measure a distance by measuring a signal reflected from an object, an optical flow 847 capable of calculating a location by recognizing a ground terrain or pattern by the use of a camera module, a temperature-humidity sensor 848 capable of measuring temperature and humidity, an illumination sensor 849a capable of measuring illumination, and an ultra violet (UV) sensor 849b capable of measuring an ultra violet ray.

The sensor module 840 may measure a distance between the unmanned aerial vehicle 800 and a ground surface. A sensor for measuring the distance between the unmanned aerial vehicle 800 and the ground surface may be the ultrasonic sensor 846 or the optical flow 847. The ultrasonic sensor 846 may output an ultrasonic save and measure the distance from the ground surface by outputting an ultrasonic wave reflected from the ground surface. The optical flow 847 may recognize a bottom terrain or pattern by using an image capturing device such as a camera or the like to measure a distance to the ground surface from the unmanned aerial vehicle 800.

The communication module 850 may include at least one of a wireless communication module and a wired communication module. The communication module 850 includes an RF module 851, a cellular module 852, a WiFi module 853, a Bluetooth module 854, and a GPS module 855.

The GPS module 855 may output location information such as longitude, latitude, altitude, GPS speed, GPS heading, etc., the unmanned aerial vehicle 800 during the movement of the unmanned aerial vehicle 800. The location information may be calculated by measuring an accurate time and distance through the GPS module 855. The GPS module 855 may acquire not only the latitude, longitude, and altitude locations but also the accurate time together with three-dimensional velocity information.

The communication module 850 may perform communication for receiving a movement operating signal of another electronic device (e.g., a controller) and the unmanned aerial vehicle 800 or transmitting location information for acquiring a real-time movement state. The communication module 850 may transmit an image captured in the unmanned aerial vehicle 800 and capturing information to an external electronic device such as the controller or the like.

The audio module 860 may bilaterally convert sound and electric signals. The audio module 860 may process sound information which is input or output through a speaker, a receiver, an earphone, a microphone, or the like.

The indicator 870 may indicate a particular state of the unmanned aerial vehicle 800 or a portion thereof, such as a booting state, a message state, a charging state, or the like.

The memory module 880 may include an internal memory and an external memory. A related command or data may be stored in at least one different constitutional element of the unmanned aerial vehicle 800. The memory module 890 may store a software and/or a program. The program may include a kernel, a middleware, an application programming interface (API), and/or an application program (or an "application") or the like.

The camera module 890 (or an image capturing device) may include a camera 891 and/or a gimbal 892. The gimbal 892 may include a gimbal control 894, a gyro/acceleration sensor 893, motor drivers 895 and 896, and/or motors 897 and 898.

Although not shown, the camera module 890 may include a lens, an image sensor, an image signal processor, a camera controller, etc. The lens may perform a focusing function by using a property of straightness and refraction of light and a function of zooming in/out a subject. The image sensor may have a structure of a complementary metal-oxide-semiconductor (CMOS) image sensor, a contact image sensor (CIS), or a Charge Coupled Device (CCD).

The image processing unit may include an image pre-processing unit for performing operations such as auto white balance (AWB), auto exposure (AE), auto focusing (AF) extraction and processing, lens shading correction, or the like and an image post-processing unit which performs color interpolation, color interpolation, image processing chain (IPC), color conversion, or the like. In addition, the image processing unit may include an encoder capable of encoding processed images and a decoder capable of decoding encoded images.

The camera controller may adjust a composition and/or a camera angle (a capturing angle) with respect to a subject by adjusting up/down/left/fight angles of a lens on the basis of composition information and/or camera control information which is output from the processor 810.

The gimbal 892 may control an inclination of the camera 891 so that the camera 891 maintains its posture regardless of a movement of the unmanned aerial vehicle 800. The gimbal 898 may include a sensor 893 for controlling the inclination, a gimbal controller 894, and motor drivers 895 and 896.

Figure 9:
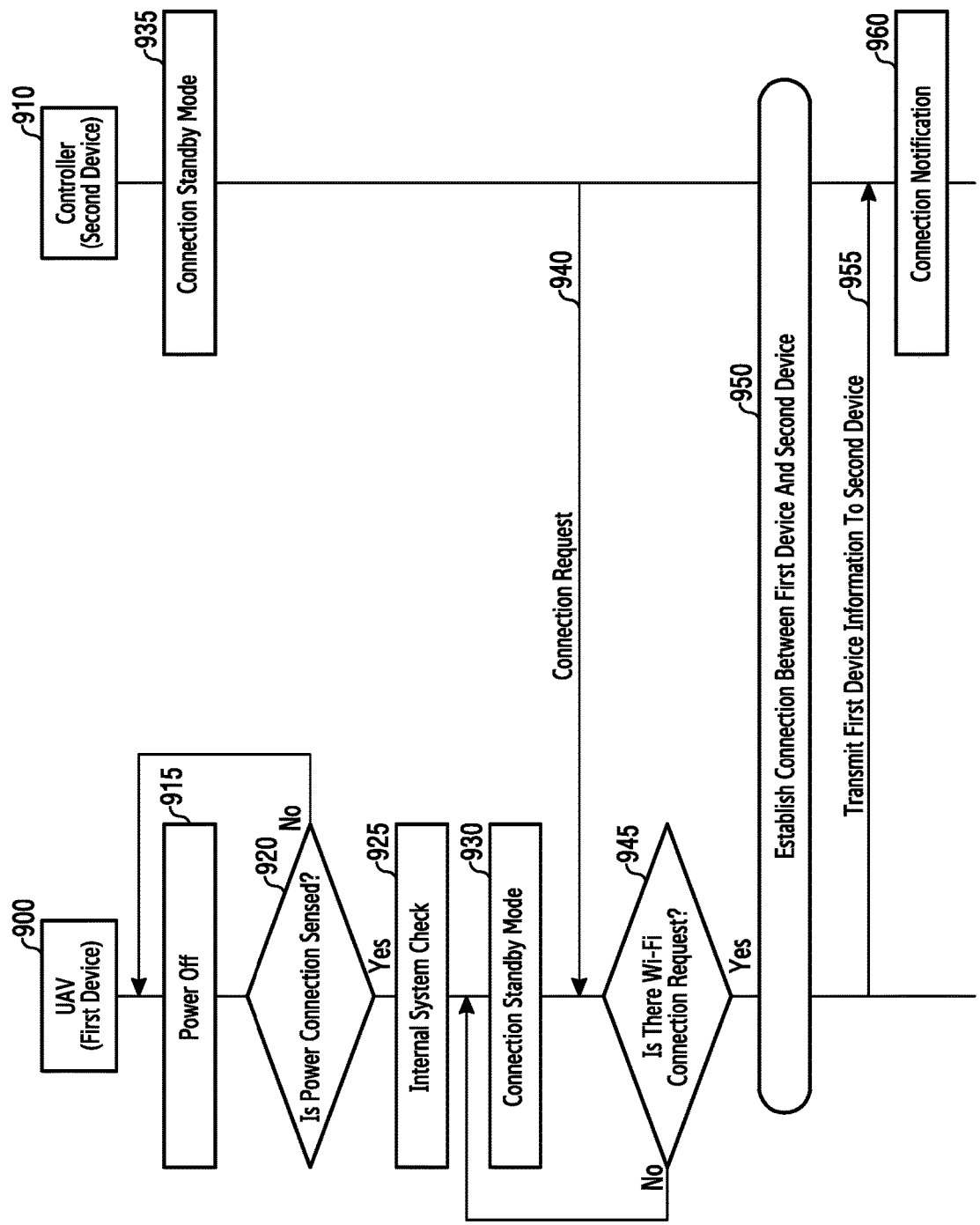
FIG. 9 is a flowchart of a connection scenario between an unmanned aerial vehicle and a controller according to an embodiment.

FIG. 9 is a flowchart of a connection scenario between an unmanned aerial vehicle and a controller according to an embodiment..

Referring to FIG. 9, a controller 910 may be an external electronic device which serves to control a movement of the unmanned aerial vehicle 900 or display a flight state and/or internal system information of the unmanned aerial vehicle 900 to a user, and may include a smart phone, a tablet PC, a wearable electronic device, or the like. In operation 915, the unmanned aerial vehicle 900 may maintain a power-off state where power is physically cut off in a non-driving state (or a storage state). The unmanned aerial vehicle 900 may maintain a state where respectively disposed connectors and battery units are physically separated from each other in the storage state where a first housing structure and a second housing structure slidably move in a direction of being separated from each other.

In operation 920, the unmanned aerial vehicle 900 may sense whether power is connected. When the power is connected, operation 925 may be performed, and when the power is not connected, returning to operation 915, the power-off state may be maintained. The unmanned aerial vehicle 900 may transition to a flight state where the first housing structure and the second housing structure slidably move in a direction of facing each other in a storage state, and thus connectors and battery units respectively disposed thereto may be physically coupled to each other. The connector may serve to supply power to a variety of electronic components necessary to drive the unmanned aerial vehicle 900 by using the power supplied from the battery unit.

When the connector and the battery unit are physically coupled, it may be sensed that the power is connected. A connection/separation between the connector and the battery unit is achieved when a user performs a sliding operation of the first and second housing structures, a sudden connection/separation may cause a problem such as a load and various errors in an internal system of the unmanned aerial vehicle 900. The unmanned aerial vehicle 900 may further include an electronic circuit having a function capable of supplying power to electronic components and detecting a power connection when a connection of the connector and the battery unit is maintained for at least a predetermined time.

In operation 925, the unmanned aerial vehicle 900 may identify whether the internal system operates abnormally upon sensing the power connection. It may be identified whether a sensor module of the unmanned aerial vehicle 900 and/or a movement module for driving a propulsion system operate abnormally. The unmanned aerial vehicle 900 may identify a power remaining amount of the coupled battery unit. After identifying whether the identified internal system operates abnormally, the unmanned aerial vehicle 900 may perform operation 930.

In operation 930, the unmanned aerial vehicle 900 may operate in a connection standby mode for wireless communication with the controller 910. In this case, in operation 935, the controller 910 may operate in the connection standby mode for wireless communication with the unmanned aerial vehicle 900. The controller 910 may operate in the connection standby mode by turning power on or by executing an application for adjusting the unmanned aerial vehicle 900.

In operation 940, the controller 910 may request a wireless communication connection with the unmanned aerial vehicle 900. The controller 910 may transmit a signal for requesting the wireless communication connection to the unmanned aerial vehicle 900. The request signal may be transmitted automatically when the controller 910 detects that the unmanned aerial vehicle 900 is operating in the connection standby mode or may be transmitted in response to reception of a user's request input in the controller 910.

In operation 945, the unmanned aerial vehicle 900 may identify whether there is a connection request from the controller 910. Upon receiving the connection request, the unmanned aerial vehicle 900 may perform operation 950, and if there is no connection request, returning to operation 930, may operate in the connection standby mode.

In operation 950, a wireless communication connection between an unmanned aerial vehicle (a first device) and a controller (a second device) may be established. The unmanned aerial vehicle 900 (or the communication module) may be coupled to the controller 910 on the basis of Bluetooth, Bluetooth Low Energy (BLE), Long Term Evolution (LTE) direct, a Wireless-Fidelity (WiFi) direction, or the like. The unmanned aerial vehicle 900 may be coupled to the controller 910 on the basis of a cellular communication technique such as LTE or a technique requiring a relay node such as a Wi-Fi technique. The unmanned aerial vehicle 900 and the controller 910 may be coupled to each other through a wired communication means such as a USB connector or the like.

In operation 955, the unmanned aerial vehicle 900 may transmit information of the unmanned aerial vehicle (a first device) to the controller 910 (a second device). The information may be information including a general qualification of the unmanned aerial vehicle 900, and may be information, identified by the unmanned aerial vehicle 900 in the operation 925, regarding whether the internal system operates abnormally. In an embodiment, the unmanned aerial vehicle 900 may transmit the information to the controller 910, and may display a notification on a display means included in the unmanned aerial vehicle 900 on the basis of the information. An indicator of the unmanned aerial vehicle 900 may display a particular state of the unmanned aerial vehicle 900 or its sub-components, such as a booting state, a message state, a charging state indicating a battery remaining amount, or the like.

In operation 960, the controller 910 may display a connection completion notification on the basis of first device information received from the unmanned aerial vehicle 900.

Figure 10:
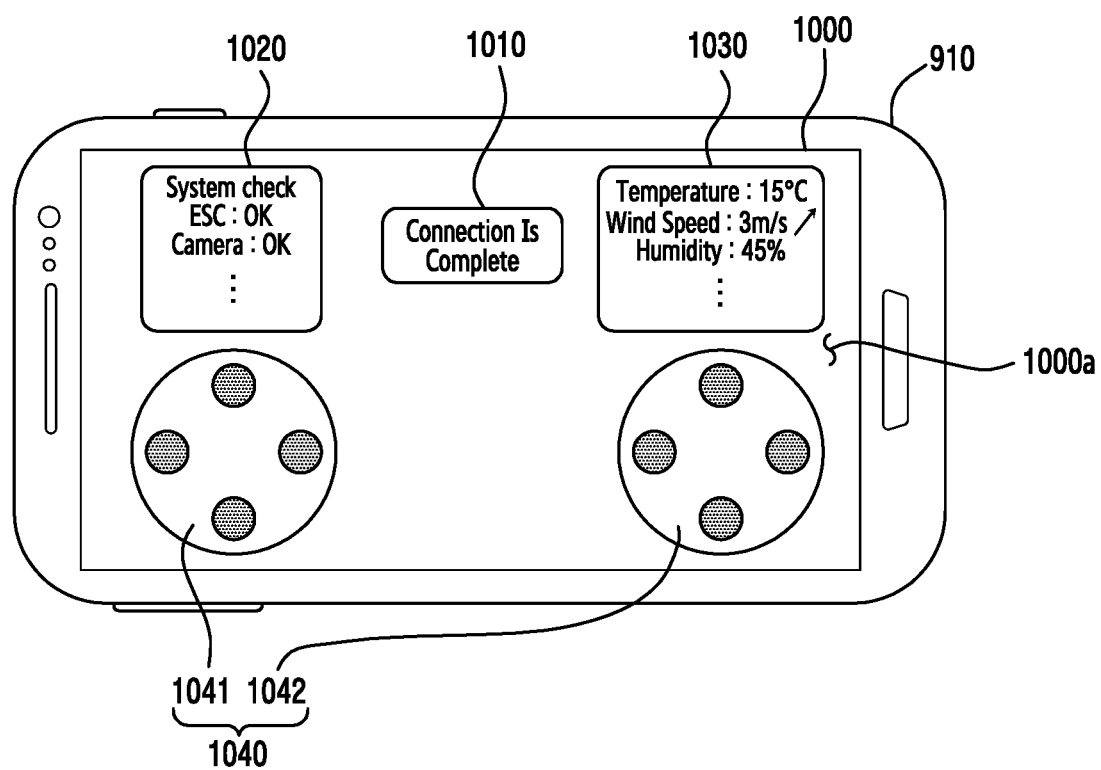
FIG. 10 is a diagram of a User Interface (UI) of a controller according to an embodiment.

FIG. 10 is a diagram of a User Interface (UI) of a controller according to an embodiment.

Referring to FIG. 10, a controller (e.g., the controller 910 of FIG. 9) may display a variety of graphical user interfaces (GUIs) for steering an unmanned aerial vehicle. The controller may display a UI 1010 capable of notifying a display 1000 that a connection with the unmanned aerial vehicle is complete. A method of notifying that the connection is complete may be performed not only by the display 1000 but also by various methods such as sound, vibration, or the like.

The controller may display internal system information 1020 of the unmanned aerial vehicle, received from the unmanned aerial vehicle, and/or surrounding environment information 1030 of a current location of the unmanned aerial vehicle (e.g., weather, temperature, wind speed, etc.) on the display 1000. The controller 910 may further display a UI 1040 in a steering mode on the display 1000 so that a user can steer the unmanned aerial vehicle. The UI 1040 in the steering mode may include a left-joystick 1041 capable of controlling a throttle and yaw of the unmanned aerial vehicle and a right-joystick 1042 capable of controlling a pitch and roll of the unmanned aerial vehicle.

The unmanned aerial vehicle may include a transformable main body of which a total length can be changed, thereby maximizing a size of the main body so as to accommodate an arm configured to fix a propeller when it is stored, or minimizing the size of the main body in flight. Therefore, the unmanned aerial vehicle may have enhanced flight performance, increased concentration of a center of gravity, and minimize air resistance, thereby improving flight performance.

The unmanned aerial vehicle may include the transformable main body, and thus structurally blocks a battery connection when stored, thereby preventing unnecessary power consumption and safety accidents.

According to an embodiment, an unmanned aerial vehicle may include a housing comprising a first housing structure and a second housing structure, a wireless communication circuit coupled to the housing or located inside the housing for wireless communication with an external controller, a plurality of propulsion systems coupled to the housing, and a navigation circuit configured to control the plurality of propulsion systems. At least one of the plurality of propulsion systems may include a plurality of folding arms pivotally coupled to one of the first housing structure and the second housing structure, a motor controlled by the navigation circuit, and a propeller coupled to the motor. In both of the first housing structure and the second housing structure, the housing may be configured to have a first length in a first state and have a second length longer than the first length in a second state, the housing may have at least one recess to accommodate at least part of the plurality of propulsion systems in the second state, and the unmanned aerial vehicle may be configured to fly by using the plurality of propulsion systems located outside the recess in the first state.

The first housing structure and the second housing structure may be slidably coupled to each other along a first axis, slidably move such that a total length of the housing along the first axis has the first length in the first state, and be configured such that the total length has the second length in the second state.

The plurality of folding arms may include a first folding arm coupled to the first housing structure and a second folding arm coupled to the second housing structure, and the first folding arm may have a third length and the second folding arm has a fourth length.

The third length and the fourth length may be longer than half of the first length and shorter than half of the second length.

A sum of the third length and the fourth length may be longer than the first length and shorter than the second length.

The plurality of folding arms may rotate so as to be at least partially inserted to the housing in the first state.

One end of each of the plurality of folding arms may be pivotally coupled to the housing, and one of the plurality of the propulsion systems may be disposed to the other end. At least one of the plurality of folding arms may include a fixing hook located at the other end. The first housing structure and the second housing structure may include respective openings at a position at which the fixing hook is inserted in the second state.

The second housing structure may include a button-type hook at one end along with an opposite direction of a direction in which the first housing structure is located. The first housing structure may include a hook hole to which the button-type hook is fastened in the first state.

The unmanned aerial vehicle may further include a battery unit detachably coupled in a sliding manner along with the first axis with respect to the second housing structure.

The unmanned aerial vehicle may further include a fastening structure configured to fix the battery unit to the second housing structure.

The fastening structure may include a button and a guide shaft extended to a lower portion of the button. The button may be configured to be pressed in a direction perpendicular to a direction in which the battery unit slidably moves, and the second housing structure may include an inclined portion at a position corresponding to a position of the button. The guide shaft may be slid with respect to the inclined portion when the button is pressed, and thus may slidably move in a direction in which the battery unit is mutually separated from the second housing structure.

A connector which provides a path for supplying power to the unmanned aerial vehicle from the battery unit may be disposed to the first housing structure. The battery unit may be coupled to the connector when the unmanned aerial vehicle is in the first state, and may be separated from the connector when the unmanned aerial vehicle is in the second state.

The battery unit and the connector may be disposed in parallel according to a trajectory of a sliding operation of the housing.

The propulsion system may include a motor and a propeller. The propeller may be detachably coupled to the motor.

The recess may include a first accommodating space provided in the first housing structure and a second accommodating space coupled to the first accommodating space and provided in the second housing structure. A volume of the first accommodating space and the second accommodating space may be changed by a sliding operation of the housing.

According to an embodiment, an unmanned aerial vehicle includes a housing including a first housing structure to which an electronic speed control (ESC) module is mounted, and a second housing structure to which a battery unit is mounted, when the second housing structure is slidably coupled to the first housing structure along a first axis, a wireless communication circuit coupled to the housing, located in the housing, and configured to wirelessly communicate with an external controller, and a plurality of propulsion systems coupled to the housing and controlled by the ESC module. The second housing structure may slidably move with respect to the first housing structure such that the ESC module and the battery unit may be coupled to or separated from each other.

The battery unit may include a socket, and the ESC module may include a plug. The socket may be disposed at a position corresponding to a position of the plug along the first axis so as to be coupled to or separated from the plug depending on a sliding movement of the housing.

The first housing structure may further include a first component, and the second housing structure further comprises a second component. The first component and the second component may be coupled by a flexible printed circuit board (FPCB).

The unmanned aerial vehicle may further include a plurality of folding arms respectively including the plurality of propulsion systems. The plurality of folding arms may be pivotally coupled to the housing so as to protrude with respect to the housing in a first state where the ESC module and the battery unit are coupled or so as to be folded such that at least part thereof is accommodated in the housing in a second state where the ESC module and the battery unit are separated.

The battery unit may be detachably coupled in a sliding manner with respect to the second housing structure, and may include a fastening structure configured to be fixed to the second housing structure.

The fastening structure may include a button and a guide shaft extended to a lower portion of the button. The button may be configured to be pressed in a direction perpendicular to a direction in which the battery unit slidably moves, and the second housing structure may include an inclined portion at a position corresponding to a position of the button. The guide shaft may be slid with respect to the inclined portion when the button is pressed, and thus may slidably move in a direction in which the battery unit is mutually separated from the second housing structure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An unmanned aerial vehicle, comprising:
   a housing including a first housing structure and a second housing structure;
   a wireless communication circuit coupled to the housing or located inside the housing for wireless communication with an external controller;
   a plurality of propulsion systems coupled to the housing; and
   a navigation circuit configured to control the plurality of propulsion systems,
   wherein at least one of the plurality of propulsion systems comprises:
      a plurality of folding arms pivotally coupled to one of the first housing structure and the second housing structure;
      a motor controlled by the navigation circuit; and
      a propeller coupled to the motor,
   wherein the housing is configured to have a first length in a first state and have a second length, which is longer than the first length, in a second state,
   wherein the housing has at least one recess to accommodate at least part of the plurality of propulsion systems in the second state,
   wherein the unmanned aerial vehicle is configured to fly by using the plurality of propulsion systems located outside the recess in the first state,
   wherein the first housing structure and the second housing structure are slidably coupled to each other along a first axis, slidably move such that a total length of the housing along the first axis has the first length in the first state, and are configured such that the total length has the second length in the second state, wherein the recess comprises a first accommodating space provided in the first housing structure and a second accommodating space coupled to the first accommodating space and provided in the second housing structure, and wherein a volume of the first accommodating space and the second accommodating space is changed by a sliding operation of the housing.

2. The unmanned aerial vehicle of claim 1, wherein the plurality of folding arms rotate so as to be at least partially inserted into the housing in the first state.

3. The unmanned aerial vehicle of claim 1,
wherein one end of each of the plurality of folding arms is pivotally coupled to the housing, and one of the plurality of the propulsion systems is disposed to another end,
wherein at least one of the plurality of folding arms comprises a fixing hook located at the other end, and
wherein the first housing structure and the second housing structure further comprise respective openings at a position at which the fixing hook is inserted in the second state.

4. The unmanned aerial vehicle of claim 1, wherein the second housing structure further comprises a fixing hook at one end, and
wherein the first housing structure further comprises a hook hole to which the fixing hook is fastened in the first state.

5. The unmanned aerial vehicle of claim 1, wherein the propulsion systems further comprise a motor and a propeller, and
wherein the propeller is detachably coupled to the motor.

6. The unmanned aerial vehicle of claim 1, wherein the plurality of folding arms comprise:
a first folding arm coupled to the first housing structure; and
a second folding arm coupled to the second housing structure, and
wherein the first folding arm has a third length and the second folding arm has a fourth length.

7. The unmanned aerial vehicle of claim 6, wherein the third length and the fourth length are longer than half of the first length and shorter than half of the second length.

8. The unmanned aerial vehicle of claim 6, wherein a sum of the third length and the fourth length is longer than the first length and shorter than the second length.

9. The unmanned aerial vehicle of claim 1, further comprising a battery unit detachably coupled in a sliding manner along with the first axis with respect to the second housing structure.

10. The unmanned aerial vehicle of claim 9, further comprising a fastening structure configured to fix the battery unit to the second housing structure,
wherein the fastening structure comprises a button and a guide shaft extended to a lower portion of the button,
wherein the button is configured to be pressed in a direction perpendicular to a direction in which the battery unit slidably moves, and the second housing structure comprises an inclined portion at a position corresponding to a position of the button, and
wherein the guide shaft is slid with respect to the inclined portion when the button is pressed, and slidably moves in a direction in which the battery unit is mutually separated from the second housing structure.

11. The unmanned aerial vehicle of claim 9, wherein a connector which provides a path for supplying power to the unmanned aerial vehicle from the battery unit is disposed to the first housing structure, and
wherein the battery unit is coupled to the connector when the unmanned aerial vehicle is in the first state, and is separated from the connector when the unmanned aerial vehicle is in the second state.

12. The unmanned aerial vehicle of claim 11, wherein the battery unit and the connector are disposed in parallel according to a trajectory of a sliding operation of the housing.

13. An unmanned aerial vehicle, comprising:
a housing including a first housing structure to which an electronic speed control (ESC) module is mounted, and a second housing structure to which a battery unit is mounted, when the second housing structure is slidably coupled to the first housing structure along a first axis;
a wireless communication circuit coupled to the housing, located in the housing, and configured to wirelessly communicate with an external controller; and
a plurality of propulsion systems coupled to the housing and controlled by the ESC module,
wherein the second housing structure slidably moves with respect to the first housing structure such that the ESC module and the battery unit are coupled to or separated from each other,
wherein the battery unit is detachably coupled in a sliding manner with respect to the second housing structure, and further comprises a fastening structure configured to be fixed to the second housing structure,
wherein the fastening structure comprises a button and a guide shaft extended to a lower portion of the button,
wherein the button is configured to be pressed in a direction perpendicular to a direction in which the battery unit slidably moves, and the second housing structure comprises an inclined portion at a position corresponding to a position of the button, and
wherein the guide shaft is slid with respect to the inclined portion when the button is pressed, and slidably moves in a direction in which the battery unit is mutually separated from the second housing structure.

14. The unmanned aerial vehicle of claim 13, wherein the battery unit comprises a socket,
wherein the ESC module comprises a plug, and
wherein the socket is disposed at a position corresponding to a position of the plug along the first axis so as to be coupled to or separated from the plug depending on a sliding movement of the housing.

15. The unmanned aerial vehicle of claim 13, wherein the first housing structure further comprises a first component,
wherein the second housing structure comprises a second component, and
wherein the first component and the second component are coupled by a flexible printed circuit board (FPCB).

16. The unmanned aerial vehicle of claim 13, further comprising a plurality of folding arms respectively including the plurality of propulsion systems, wherein the plurality of folding arms are pivotally coupled to the housing so as to protrude with respect to the housing in a first state where the ESC module and the battery unit are coupled or so as to be folded such that at least part thereof is accommodated in the housing in a second state where the ESC module and the battery unit are separated.

* * * * *